(12) United States Patent
Linkous et al.

(10) Patent No.: US 9,973,465 B1
(45) Date of Patent: May 15, 2018

(54) END-TO-END TRANSACTION TRACKING ENGINE

(71) Applicant: HCA Holdings, Inc., Nashville, TN (US)

(72) Inventors: Kevin Ronald Linkous, Thompson's Station, TN (US); Alan Scott, Franklin, TN (US); Ryan Staggs, Brentwood, TN (US); William Landon Barnickle, Nashville, TN (US); Scott A. Southworth, Antioch, TN (US); Shannon Dewayne Dickens, Nashville, TN (US)

(73) Assignee: HCA Holdings, Inc., Nashville, TN (US)

( * ) Notice: Subject to any disclaimer, the term of this patent is extended or adjusted under 35 U.S.C. 154(b) by 0 days. days.

(21) Appl. No.: 15/670,932

(22) Filed: Aug. 7, 2017

Related U.S. Application Data

(63) Continuation-in-part of application No. 15/015,597, filed on Feb. 4, 2016.

(60) Provisional application No. 62/113,154, filed on Feb. 6, 2015.

(51) Int. Cl.
*G06F 15/16* (2006.01)
*H04L 12/58* (2006.01)
*H04L 12/755* (2013.01)
*H04L 12/721* (2013.01)

(52) U.S. Cl.
CPC ............ *H04L 51/34* (2013.01); *H04L 45/021* (2013.01); *H04L 45/12* (2013.01); *H04L 51/08* (2013.01)

(58) Field of Classification Search
USPC .................................. 709/206, 202, 223, 224
See application file for complete search history.

*Primary Examiner* — Lan-Dai T Truong
(74) *Attorney, Agent, or Firm* — Kilpatrick Townsend & Stockton

(57) ABSTRACT

A transaction management platform is provided that is configured to perform end-to-end tracking of transactions including messages. The messages may be tracked using universal message identifiers that are generated and associated with messages. The universal message identifiers are generated based on a message list received from a source node. A predicted path is determined for each message based on a message type for each message. The movements of a particular message are tracked by sending queries requesting message statuses to each node within the particular message's predicted path. A record associated with the particular message is updated after receiving query responses.

20 Claims, 17 Drawing Sheets

| Created | Source App | Facility | Msg Type | MCID | @Src | @CL |
|---|---|---|---|---|---|---|
| 2014-08-26 00:00:00 | MT | COCGBT | ADT | GOPHSS.1.742027 | Y | |
| 2014-08-26 00:00:00 | MT | COCGO | ADT | GOPHSS.1.399518 | Y | Y |
| 2014-08-26 00:00:00 | MT | COCGBT | ADT | GBTGTADM.1.9669198 | Y | |
| 2014-08-26 00:00:00 | MT | COCGO | ADT | GBTPHSS.1.742028 | Y | |
| 2014-08-26 00:00:00 | MT | COCGBT | ADT | GOPHSS.1.399519 | Y | Y |
| 2014-08-26 00:00:00 | MT | COCGBT | ADT | GBTGTADM.1.9669199 | Y | |
| 2014-08-26 00:00:00 | MT | COCGO | ADT | GBTPHSS.1.742029 | Y | Y |
| 2014-08-26 00:00:00 | MT | CACGBT | ADT | GOPHSS.1.399520 | Y | |
| 2014-08-26 00:00:00 | MT | COCGO | ADT | GBTPHSS.1.742026 | Y | |
| | | | | GOGTADM.1.14794698 | Y | Y |

FIG. 11

END-TO-END TRANSACTION TRACKING ENGINE

CROSS-REFERENCE TO RELATED APPLICATIONS

The present application is a continuation-in-part application which claims the priority benefit under 35 U.S.C. 119(e) to U.S. Ser. No. 15/015,597, filed on Feb. 4, 2016, which claims priority to U.S. Provisional Application No. 62/113,154, filed on Feb. 6, 2015. The entire disclosures of each of the above applications are incorporated by reference herein in their entirety for all purposes.

BACKGROUND

This specification relates in general to transaction tracking and, but not by way of limitation, to transaction tracking within a network and presentation of results relating to transaction tracking.

The growth of networks, both private and public, has resulted in increasingly complex infrastructures that support communications within the networks. In an example network, in addition to the presence of end point nodes in the network, an underlying infrastructure can include many other nodes through which a transaction must travel on its path from an originating node to a destination node. The more nodes along its path, the more likely it is that the transaction will not reach its destination node. The reasons why it may not reach its destination node can be various. For example, the transaction may have an improper address or an intermediate node may be offline or not processing transactions appropriately. However, diagnosing the reason using conventional methods of transaction tracking may prove burdensome, time consuming, and/or impossible. This is especially true when the individual diagnosing lacks a first-hand understanding of the network and infrastructure.

SUMMARY

In a first set of embodiments of the present disclosure, a computer-implemented method for tracking movements of messages within a network is provided. The method may include sending, by a computer system, an initial query to a source node of the network, the initial query requesting a message list comprising information about a plurality of messages originating from the source node, each message of the plurality of messages representative of a single transaction within the network. The method may also include receiving, by the computer system, the message list from the source node. The method may further include generating, by the computer system, a universal message identifier for each of the plurality of messages based in part on the message list, each universal message identifier comprising a concatenation of two or more of a source application identifier, a source facility identifier, a message type identifier, and a message control identifier. The method may include identifying, by the computer system, a message type for each of the plurality of messages based in part on the message list. The method may also include determining a predicted path for each of the plurality of messages based in part on the respective message type and the message list. The method may further include storing a record for each of the plurality of messages in a data store, each record associated with the respective universal message identifier. The method may include tracking movements of a particular message of the plurality of messages within the network by sending, by the computer system, a first query to a node of the network requesting a message status for the particular message with respect to the node of the network, the predicted path for the particular message including the node, receiving, by the computer system, information indicating the message status, and updating a particular record in the data store to reflect the message status.

In a second set of embodiments of the present disclosure, a computer readable storage media for tracking movements of messages within a network is provided. The computer readable storage media may include instructions to cause one or more processors to perform operations including sending an initial query to a source node of the network, the initial query requesting a message list comprising information about a plurality of messages originating from the source node, each message of the plurality of messages representative of a single transaction within the network. The operations may also include receiving the message list from the source node. The operations may further include generating a universal message identifier for each of the plurality of messages based in part on the message list, each universal message identifier comprising a concatenation of two or more of a source application identifier, a source facility identifier, a message type identifier, and a message control identifier. The operations may include identifying a message type for each of the plurality of messages based in part on the message list. The operations may also include determining a predicted path for each of the plurality of messages based in part on the respective message type and the message list. The operations may further include storing a record for each of the plurality of messages in a data store, each record associated with the respective universal message identifier. The operations may include tracking movements of a particular message of the plurality of messages within the network by, sending a first query to a node of the network requesting a message status for the particular message with respect to the node of the network, the predicted path for the particular message including the node, receiving information indicating the message status, and updating a particular record in the data store to reflect the message status.

In a third set of embodiments of the present disclosure, a system for tracking movements of messages within a network is provided. The system may include one or more processors. The system may also include one or more computer readable storage mediums comprising instructions to cause the one or more processors to perform operations including sending an initial query to a source node of the network, the initial query requesting a message list comprising information about a plurality of messages originating from the source node, each message of the plurality of messages representative of a single transaction within the network. The operations may also include receiving the message list from the source node. The operations may further include generating a universal message identifier for each of the plurality of messages based in part on the message list, each universal message identifier comprising a concatenation of two or more of a source application identifier, a source facility identifier, a message type identifier, and a message control identifier. The operations may include identifying a message type for each of the plurality of messages based in part on the message list. The operations may also include determining a predicted path for each of the plurality of messages based in part on the respective message type and the message list. The operations may further include storing a record for each of the plurality of messages in a data store, each record associated with the respective universal message identifier. The operations may include tracking movements of a particular message of the plurality of messages within the network by sending a first query to a node of the network requesting a message status for the particular message with respect to the node of the network, the predicted path for the particular message including the node, receiving information indicating the message status, and updating a particular record in the data store to reflect the message status.

In some embodiments, the node processes the particular message after the source node processes the particular message. In some embodiments, the information indicating the message status includes a received time at which the particular message was received by the node and a sent time at which the particular message was sent by the node. In some embodiments, the node is the first node, the received time is a first received time, and the sent time is a first sent time, and tracking the movements of the particular message of the plurality of messages within the network further includes sending, by the computer system, a second query to a second node of the network requesting a second message status for the particular message with respect to the second node of the network, the predicted path including the second node, receiving, by the computer system, second information indicating the second message status, and updating the particular record in the data store to reflect the second message status, where the second information indicating the second message status for the particular message includes a second received time at which the particular message was received by the second node and a second sent time at which the particular message was sent by the second node. In some embodiments, tracking the movements of the particular message of the plurality of messages within the network further includes determining that the particular message was not received by the node, where the node is a first node and the information is first information, determining a second predicted path for the particular message based in part on the respective message type and the determination that the particular message was not received by the first node, where the predicted path is a first predicted path, sending, by the computer system, a second query to a second node of the network requesting a second message status for the particular message with respect to the second node of the network, the first predicted path not including the second node and the second predicted path including the second node, and receiving, by the computer system, second information indicating the second message status. In some embodiments, tracking the movements of the particular message of the plurality of messages within the network further includes sending, by the computer system, a second query to a destination node of the network requesting a second message status for the particular message with respect to the node of the network, the predicted path including the destination node, receiving, by the computer system, second information indicating the second message status, where the second information indicates whether the particular message was received by the destination node, and determining that the particular message needs to be reconciled based on the particular message not being received by the destination node. In some embodiments, generating the universal message identifier for each of the plurality of messages includes creating or modifying a metadata for each of the plurality of messages to include the corresponding universal message identifiers.

BRIEF DESCRIPTION OF THE DRAWINGS

Various embodiments in accordance with the present disclosure will be described with reference to the drawings, in which:

FIG. 11 is an example data table including information relating to implementing techniques relating to managing and tracking transactions within a network as described herein, according to at least one embodiment;

DETAILED DESCRIPTION

Figure 1:
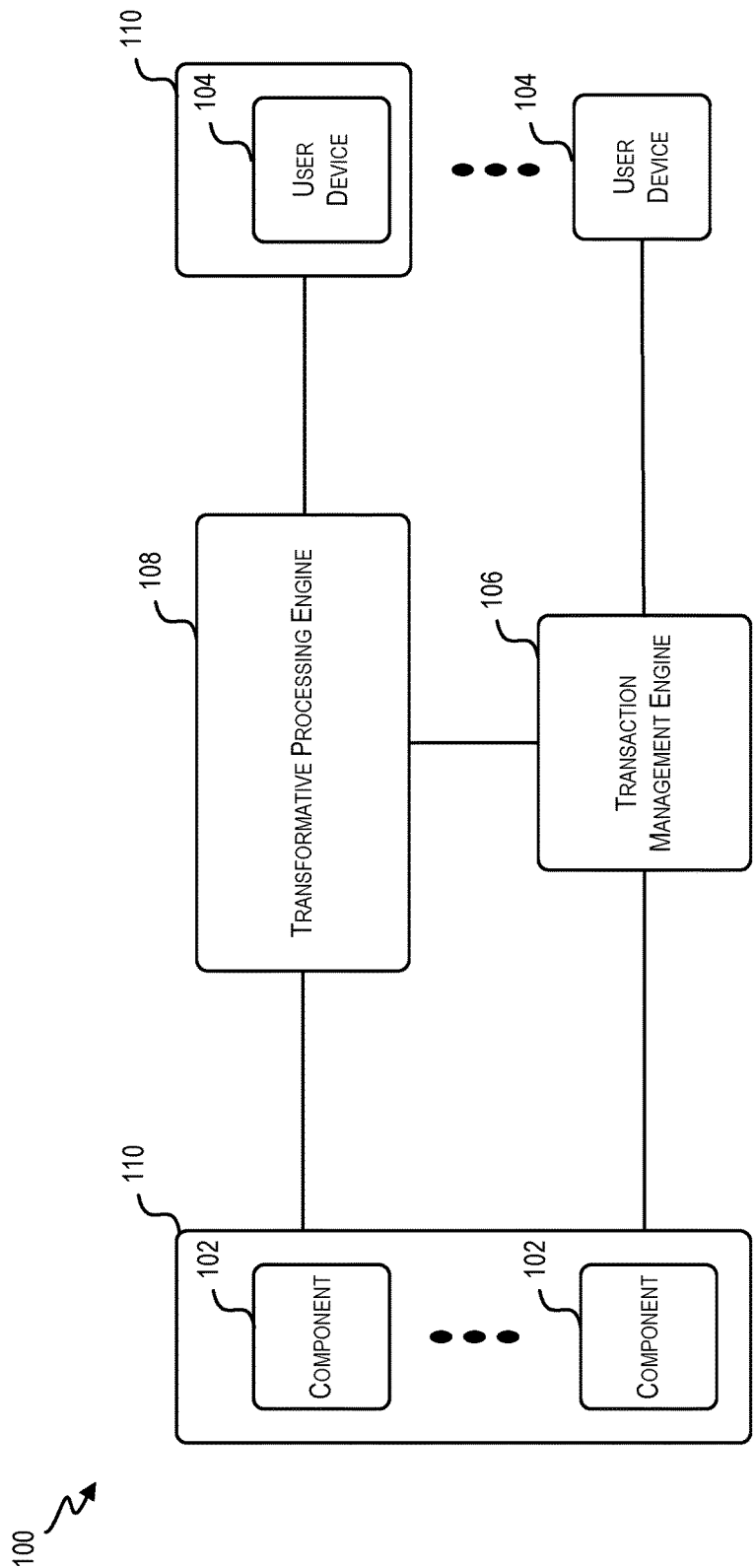
FIG. 1. is an example block diagram illustrating an environment in which techniques relating to managing and tracking transactions within a network as described herein may be implemented, according to at least one embodiment.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In one example, a method and system for tracking message transactions is provided. The messages represent a variety of different types of digital messages that may be transferred between nodes of a network. Each message that is transferred within the network may constitute a single transaction. The flow of each transaction is tracked from its originating node to its destination node and at all points in between. This tracking is performed in part by a transaction management engine. The transaction management engine is located within the network between originating nodes and destination nodes. In some examples, the transaction management engine is coupled with a transformative processing engine or a similar engine that aggregates messages. In some examples, the transaction management engine is included as part of a stand-alone transaction management platform. In any event, once the transaction management engine receives the message or an indication of the message, the transaction management engine generates a universal message identifier. The universal message identifier may include a source application identifier, a source facility identifier, a message type identifier, a message control identifier, any other suitable identifier. The universal message identifier is then associated with the message via metadata (e.g., within the header of the message) such that when the next node (e.g., component, device, server, etc.) receives the message, that node can report back to the transaction management engine that the message has been received. Each node that receives the message can send a ping back to the transaction management engine.

In one example, a reconciliation engine is provided that enables reconciliation of messages. Reconciliation of messages may be desirable in a network to identify the reasons why messages are not moving properly throughout the network. For example, messages may be held up in a cache of a node, negatively acknowledged by a node, and many other reasons. By accessing the universal message identifiers and, in some examples, other information output by the transaction management engine and information received from destination nodes, the reconciliation engine is able to determine which messages did not make it to their respective destination nodes. The information received from the destination nodes may act as a confirmation that the messages were not lost or corrupted prior to delivery to the destination nodes. In some examples, the reconciliation engine assigns a status to each message which may include: not reconciled, waiting for reconciliation, reconciled, negatively acknowledged, acknowledged, combinations of the foregoing, and other suitable statuses. Using the reconciliation engine, a case can be created and provided to a user for further exploration. The case may include a list of messages, their status, and other suitable information. Any of the data generated by the reconciliation engine may be provided for presentation on a user interface. The user interface may include filters, menus, and the like to interact with the data gathered by the reconciliation engine.

Referring first to FIG. 1, a block diagram of an embodiment of an interaction system 100 is illustrated. Generally, in interaction system 100, data can be generated at one or more system components 102 and/or user devices 104. Transaction management engine 106 can manage the flow of communications within interaction system. Transformative processing engine 108 can receive, intercept, track, integrate, process, and/or store such data.

Data flowing in interaction system 100 can include a set of communications. Each of one, some of all communications can include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include protected information.

For example, a system component 102 can include, for example, a sensor to detect a sensor measurement and can thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier can be determined, for example, based on detection of a nearby electronic tag (e.g., RFID tag), a detected user input received at a user interface of component 102, and/or data in a corresponding communication received from a user device.

As another example, a user device 104 can be configured to detect user input received at a user interface of the device. The user input can include, for example, an identifier of an object or entity, an instruction, a characterization of an object or entity, an identification of an assessment to be performed, a specification of an aggregation or data processing to be performed, and/or an identification of a destination for a data-analysis report. User device 104 can further be configured to detect user input requesting particular data, to generate a request communication (e.g., to be sent to transformative processing engine), to receive the requested data and/or to present the received data.

Data can include information that identifies a person, such as personal information and/or demographic information. For example, the information can identify a person's name, age, sex, race, physical address, phone number, email address, and/or social security number. Data may include information collected by a government agent, employer, insurer, or school or university, that relates to a past, present, or future condition or status (e.g., pertaining to employment, political involvement, occupation, health, or financial status) of any individual. For example, data may include information about past events.

Data may identify an entity being evaluated and/or one at least partly performing an evaluation. For example, a communication may identify a first company as one being evaluated and a second company as one evaluating a quality of a product of the first company. As another example, a communication may identify a first service plan of a first company as one providing an Internet network and may identify one or more users providing speed checks over the network.

The depicted engines, devices and/or components can communicate over one or more networks. A network of one or more networks can include a wired network (e.g., fiber, Ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 102 and one or more user devices 104 are illustrated as communicating via transformative processing engine 108 and/or transaction management engine 106, this specification is not so limited. For example, each of one or more components 102 may communicate with each of one or more user devices 104 directly via other or the same communication networks.

A component 102 can be configured to detect, process and/or receive data, such as environmental data, geophysical data, biometric data, chemical data (e.g., chemical composition or concentration analysis data), and/or network data. The data can be based on data detected, for example, via a sensor, received signal or user input. A user device 104 can include a device configured to receive data from a user and/or present data to a user. It will be appreciated that, in some instances, a component 102 is also a user device 104 and vice-versa. For example, a single device can be configured to detect sensor measurements, receive user input and present output.

A component 102 can be configured to generate a communication that is in one or more formats, some of which can be proprietary. For example, an imaging machine (e.g., one of one or more components 102) manufactured by company A, located within a first facility (e.g., facility 110), and belonging to a first client, may save and transfer data in a first format. An imaging machine (e.g., one of one or more components 102) manufactured by company B, located within the first facility (e.g., facility 110), and belonging to the first client, may save and transfer data in a second format. In some examples, data from certain components is transformed, translated, or otherwise adjusted to be recognizable by transformative processing engine 108. Thus, continuing with the example from above, when the imaging machines manufactured by companies A and B are located within the first facility belonging to the first client, they may nevertheless save and transfer data in different formats. In some examples, one or more components 102 communicate using a defined format.

In some examples, each of one or more components 102 are each associated with one or more clients within a same or different interaction systems. For example, certain ones of one or more components 102 may be associated with a first client, while other ones of one or more components 102 may be associated with a second client. Additionally, each of one or more components 102 may be associated with a facility 110 (e.g., client facility). Each facility 110 may correspond to a single location and/or processing focus. Exemplary types of facilities include server farm facilities, web-server facilities, data-storage facilities, technical-support facilities, telecommunication facilities, care facilities, and/or business operation facilities. For example, a first facility may include a structure at a first location at which one or more resources (e.g., computational resources, equipment resources, laboratory resources, and/or human resources) are provided. Each of the one or more resources may be of a first type in a first set of types. A resource type can be identified based on, for example, a characteristic of the resource (e.g., sensor inclusion) and/or a capability of providing each of one or more services. Thus, for example, resources at a first facility may be better configured for handling a particular type of service requests compared to those in another facility. As another example, different facilities may include resources of similar or same types but may vary in terms of, for example, user accessibility, location, managing client, etc.

Transmission of data from one or more components 102 to transformative processing engine 108 may be triggered by a variety of different events. For example, the data may be transmitted periodically, upon detection of an event (e.g., completion of an analysis or end of a procedure), upon detection of an event defined by a rule (e.g., a user-defined rule), upon receiving user input triggering the transmission, or upon receiving a data request from transformative processing engine 108. Each transmission can include, e.g., a single record pertaining to a single entity, object, procedure, or analysis or multiple records pertaining to multiple entities, objects, procedures, or analyses.

In some examples, at least some of one or more user devices 104 are associated with facility 110. In some examples, at least some of one or more user devices 104 need not be associated with facility 110 or any other facility. Similar to one or more components 102, one or more user devices 104 may be capable of receiving, generating, processing, and/or transmitting data. Examples of one or more user devices 104 include, for example, a computer, a mobile device, a smart phone, a laptop, an electronic badge, a set-top box, a thin client device, a tablet, a pager, and other similar user devices). One or more user devices 104 may be configured to run one or more applications developed for interacting with data collected by transformative processing engine 108. For example, those user devices of one or more user devices 104 that are not associated with facility 110 may be configured to run one or more third-party applications that may rely in part on the data gathered by transformative processing engine 108.

Each of one or more components 102 and one or more user devices 104 may be utilized by one or more users (not shown). Each of the one or more users may be associated with one or more clients. For example, one of the one or more users can be associated with a client as a result of being employed by the client, physically located at a location of the client, being an agent of the client, or receiving a service from the client.

In some examples, one or more components 102 and one or more user devices 104 may communicate with transformative processing engine 108 and transaction management engine 106 via different information formats, different proprietary protocols, different encryption techniques, different languages, different machine languages, and the like. As will be discussed with reference to FIG. 2, transformative processing engine 108 is configured to receive these many different communications from one or more components 102, and in some examples from one or more user devices 104, in their native formats and transform them into any of one or more formats. The received and/or transformed communications can be transmitted to one or more other devices (e.g., transaction management engine 106, an entity device, and/or a user device) and/or locally or remotely stored. In some examples, transformative processing engine 108 receives data in a particular format (e.g., the HL7 format) or conforming to any other suitable format and/or is configured to transform received data to conform to the particular format.

One or more components 102 of facility 110 can include and/or has access to a local or remote memory for storing generated data. In some examples, the data is stored by one or more servers local to facility 110. Such storage may enable facility 110 to retain locally data pertaining to its facility prior to (or in conjunction with) the data being shared with transformative processing engine 108 and/or transaction management engine 106. In some examples, the one or more servers of facility 110 share data directly with a record service (not shown), and the record service makes the data available to transformative processing engine 108 and/or transaction management engine 106. Once an electronic record is updated at facility 110, an indication of the update may be provided to the record service. The record service may then update a corresponding record associated with the electronic record.

The record service can be granted access to the data generated and/or transmitted by one or more components 102. In some examples, the record service includes a server or a plurality of servers arranged in a cluster or the like. These server(s) of the record service can process and/or store data generated by one or more components 102. For example, one or more records can be generated for each entity (e.g., each record corresponding to a different entity or being shared across entities). Upon receiving a communication with data from a component (or facility), the record service can identify a corresponding record and update the record to include the data (or processed version thereof). In some examples, the record service provides data to transformative processing engine 108.

Facility 110 can include one at which a resource is located and/or service is provided. Irrespective of the type of facility, facility 110 may update data, maintain data, and communicate data to transformative processing engine 108. At least some of the data may be stored local to facility 110.

A user interacting with a user device 104 can include, for example, a client customer, client agent and/or a third party. A user may interact with user device 104 and/or component 102 so as to, for example, facilitate or initiate data collection (e.g., by a component 102), provide data, initiate transmission of a data request, access data and/or initiate transmission of a data-processing or data-storage instruction. In some instances, one or more user devices 104 may operate according to a private and/or proprietary network or protocols. In other examples, one or more user devices 104 may operate on public networks. In any case, however, transformative processing engine 108 can have access to the one or more components and can communicate with them via a public, private, and/or proprietary network or protocols. The use of one or more private and/or proprietary protocols can promote secure transfer of data.

Figure 2:
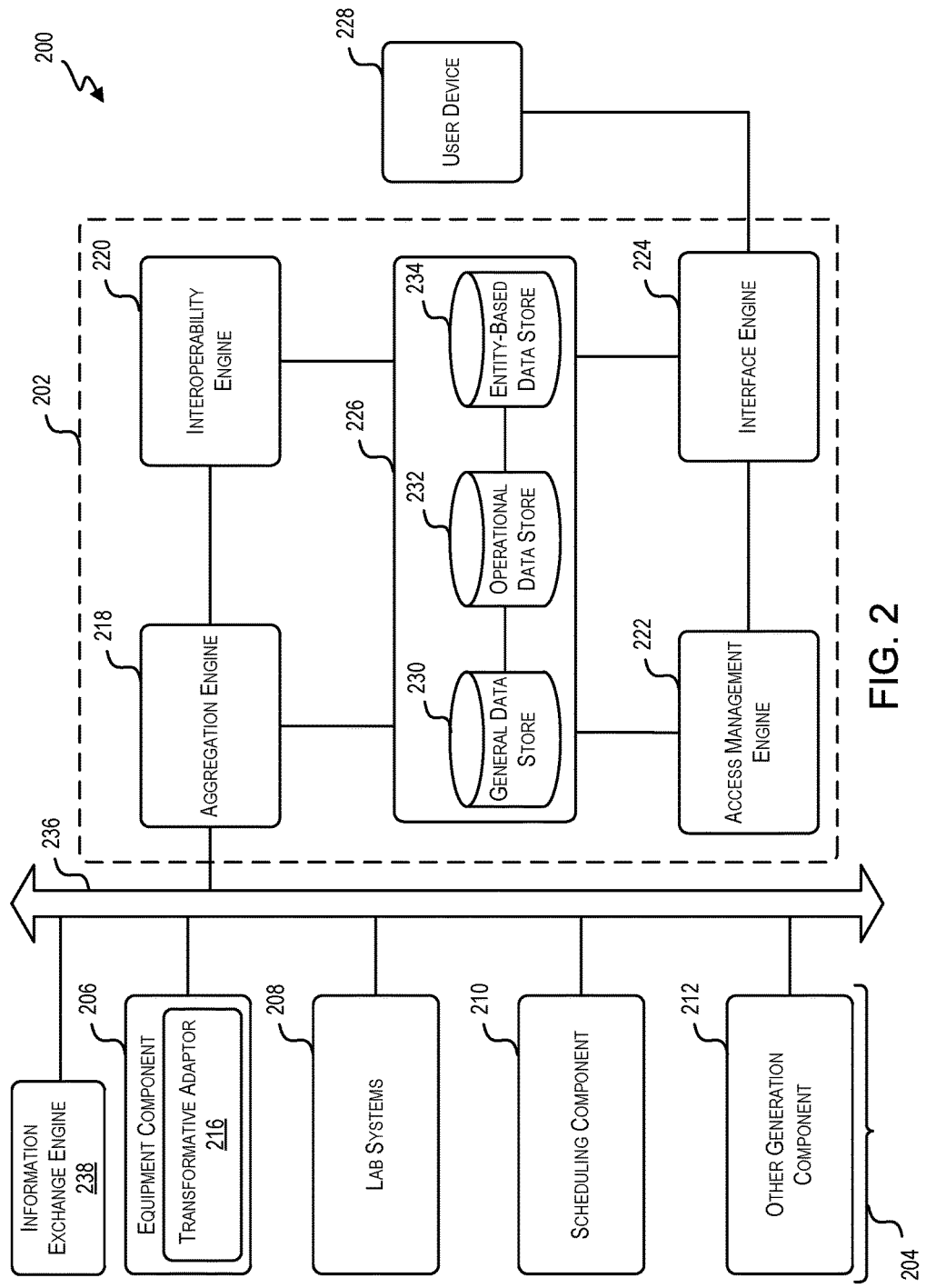
FIG. 2. is an example block diagram illustrating an environment in which techniques relating to managing and tracking transactions within a network as described herein may be implemented, according to at least one embodiment.

Referring next to FIG. 2, a block diagram of an embodiment of an interaction system 200 is shown. Interaction system 200 includes a transformative processing engine 202. Transformative processing engine 202 is an example of transformative processing engine 108 discussed with reference to FIG. 1. Interaction system 200 also includes one or more generation components 204. In particular, one or more generation components 204 include an equipment component 206, a lab systems component 208, a scheduling component 210, and other generation component 212. One or more generation components 204 are examples of one or more components 102 discussed with reference to FIG. 1. In some examples, the data may pass to the transformative processing engine 202 via an information exchange service bus 236 (e.g., an enterprise service bus). In some examples, only a portion of the is passed via the information exchange service bus 236, while other portions are passed directly to the transformative processing engine 202 without first passing over the information exchange service bus 236.

Generally, one or more generation components 204 includes any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

As discussed in further detail herein, data generated by one or more generation components 204 can be of a variety of formats, some of which may be proprietary. For example, a single component can generate data in multiple formats, different components can generate data in different formats, and/or different component types can result in generation of data in different formats. In some instances, formatting of a data can depend on a service having been provided, a user initiating data generation, a destination to receive the data, a location at which a service was provided, etc. In some examples, a typical interaction system includes thousands of generation components producing data in hundreds of formats. In order to harness the power that comes from such a large amount of data to make informed decisions, it is desirable that all, or at least a large portion of the data, is shared. Use of transformative processing engine 202 in accordance with techniques described herein may achieve this design—making large amounts of data, in many different originating formats available to various types of users, via one or more interfaces. At least a portion of the data generated by the generation components 204 may be provided to the transformative processing engine 202. In some examples, each generation component 204 includes an agent that executes on the generation components 204 and determines which data to send to the transformative processing engine 202 and other engines described herein. In some examples, the generation components 204 provide data to the transformative processing engine 202 via a messaging bus (e.g., an information exchange service bus 236). The messaging bus, which may be included in the transformative processing engine 202 or separate, is able to see data that moves throughout the interaction system 200. The information exchange service bus 236 also includes a subscription registry that can be used to manage subscriptions to the information exchange service bus 236 for certain data (e.g., data having certain characteristics). The information exchange service bus 236 may send and/or direct data to certain other entities when appropriate as indicated by subscription records in the registry.

While one or more generation components 204 are illustrated adjacent to each other, it is understood that each may be located within one facility or that the components may be spread out among many facilities. In addition, in some examples, one or more generation components 204 belong to different clients.

Turning now to equipment component 206, this component includes any machine, contrivance, implant, or other similar related article, that is intended to aid in reaching a particular objective. In some instances, equipment component 206 includes one or more sensors to detect environmental or other stimuli. Equipment component 206 can include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 includes transformative adaptor 216. In some examples, transformative adaptor 216 is a device that transforms, translates, converts, or otherwise adjusts output data from equipment component 206. For example, an equipment component 206 can be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative processing engine 202 may perform similar tasks as it relates to all data generated within interaction system 200. In this manner, transformative adaptor 216 can perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. In some examples, equipment component 206 may not include transformative adaptor 216.

Lab systems component 208 includes any suitable laboratory equipment or system that is intended to analyze material, such as biological material. This includes, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative processing engine 202.

Scheduling component 210 includes any suitable computing devices used for business-related purposes with respect to interaction system 200. For example, scheduling component 210 can be configured to schedule a resource for allocation for a particular entity during a particular time slot. Scheduling component 210 can monitor a schedule for the resource and can identify one or more available time slots that may be secured by a particular entity. Upon receiving a scheduling indication, scheduling component 210 may update a schedule of a resource to reflect that a particular time slot is to be allocated for service of a particular entity.

Each of one or more generation components 204 and the user device 228 may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and can include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors can be implemented as one or more integrated circuits, e.g., one or more single-core or multi-core microprocessors or microcontrollers, examples of which are known in the art. In operation, the one or more processors can control the operation of the particular component. The one or more processors may access and execute the program code and at any given time.

The user interface can include any combination of input and output devices. In some instances, a user can operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative processing engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative processing engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative processing engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

Transformative processing engine 202 includes an aggregation engine 218, an interoperability engine 220, an access management engine 222, an interface engine 224, and a data store 226. Generally aggregation engine 218 is configured to collect data from multiple communications. The data may be from one or multiple generation components 204 and/or may be of same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 can identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 can be configured to provide data from one or more communications to interoperability engine 220. Interoperability engine 220 can be configured to perform one or more operations on the received data and store it in data store 226. For example, interoperability engine 220 may perform semantic tagging and indexing of data. This may include extracting field values from data, categorizing data (e.g., by type of data, characteristic of an entity, location of facility, characteristic of facility, and the like), anonymizing or partially-anonymizing data, and the like. Interoperability engine 220 may also include a high availability cache, an alerts engine, and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which can include devices of different entities and/or a cloud server). In some examples, data store 226 includes a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, business and analytics information, output data from one or more generation components 204, and the like may be retained. The data within the data stores 230, 232, and 234 include elements or tags such that a particular data (e.g., for a single entity, protocol, etc.) can be retrieved.

Access management engine 222 is configured to manage access to features of transformative processing engine 202, including access to the data retained in data store 226. For example, access management engine 222 may verify that a user device such as user device 228 is authorized to access data store 226. To verify the user device 228, access management engine 222 may require that a user of the user device 228 input a username and password, have a profile associated with the interaction system, have paid a subscription fee associated with access to data store 226, and the like. Access management engine 222 may also verify that the user device 228 has an IP address or geographical location that corresponds to an authorized list, that the user device 228 includes a plug-in for properly accessing the data store 226, that the user device 228 is running certain applications required to access the data store 226, and the like.

Interface engine 224 is configured to retrieve the data from data store 226 and provide one or more interfaces for interacting with elements of transformative processing engine 202. For example, interface engine 224 includes an interface by which an application running on user device 228 can access portions of data within data store 226.

As described herein, an information exchange engine 238 shares a network connection with the information exchange service bus 236. The information exchange engine 238 is configured to monitor data (e.g., messages) that is passed over the information exchange service bus 236 and, from the monitored data, select certain portions to provide to one or more authorized users (e.g., dependent users, friends and family members of dependent users, professional users, and other suitable authorized users). The information exchange engine 238 is also configured to route inbound messages and route outbound messages, as described herein. The information exchange engine 238 is also configured to generate customized messages based on dependent user data and professional users.

Figure 3:
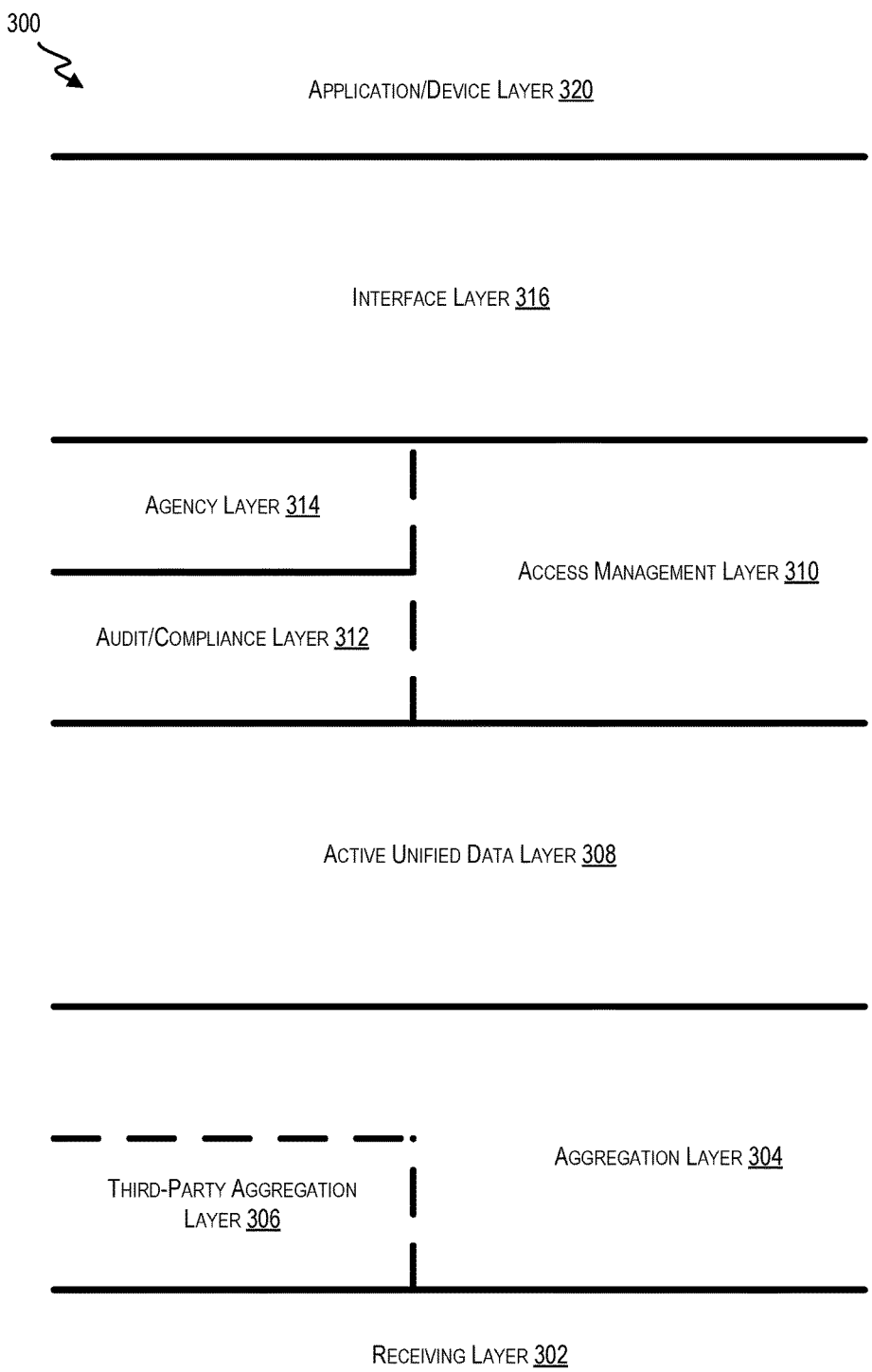
FIG. 3 is an example schematic model illustrating an a network communication model in which techniques relating to managing and tracking transactions within a network as described herein may be implemented, according to at least one embodiment.

Turning next to FIG. 3, an architecture stack 300 is shown. In some examples, techniques relating management of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 can be used to integrate different systems of different organizations, entities, and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 includes a receiving layer 302 as the bottom-most layer. Receiving layer 302 includes receiving data from elements that share data with other elements within an aggregation layer 304. For example, as detailed herein, receiving layer 302 can include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a facility, entity, time period, characteristic (e.g., demographic characteristic or condition), outcome, and any other suitable input and/or rules. The aggregation may include compiling the data, generating a distribution, generating a statistic pertaining to the data (e.g., average, median, extremum, or variance), converting the data, transforming the data to different formats, and the like.

Next, architecture stack 300 includes an active unified data layer 308. Elements of active unified data layer 308 receive data from the elements of the other layers and store such data in a unified manner. In some examples, this may include storing the data in a manner that allows for later searching and retrieval using a defined set of method calls, techniques, and or procedures. For example, the data may be stored such that a different application can access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also includes an access management layer 310, which can include an audit/compliance layer 312 and/or an agency layer 314. Access management layer 310 includes elements to manage access to the data. For example, access management layer 310 may include elements to verify user login credentials, IP addresses associated with a user device, and the like prior to granting the user access to data stored within active unified data layer 308.

Audit/compliance layer 312 includes elements to audit other elements of architecture stack 300 and ensure compliance with operating procedures. For example, this may include tracking and monitoring the other elements of access management layer 310.

Agency layer 314 includes an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access management layer 310 and the data within active unified data layer 308. Audit/compliance layer 312 and agency layer 314 are sub-layers of access management layer 310.

Architecture stack 300 also includes interface layer 316. Interface layer 316 provides interfaces for users to interact with the other elements of architecture stack 300. For example, clients, entities, administrators, and others belonging to the interaction system may utilize one or more user devices (interacting within application/device layer 320) to access the data stored within active unified data layer 308. In some examples, the users may be unrelated to the interaction system (e.g., ordinary users, research universities, for profit and non-profit research organizations, organizations, and the like) and may use applications (not shown) to access the elements within architecture stack 300 via one or more interfaces (e.g., to access data stored within active unified data layer 308). Such applications may have been developed by the interaction system or by third-parties Finally, architecture stack 300 includes application/device layer 320. Application/device layer 320 includes user devices and applications for interacting with the other elements of architecture stack 300 via the elements of interface layer 316. For example, the applications may be web-based applications, entity portals, mobile applications, widgets, and the like for accessing the data. These applications may run on one or more user devices. The user devices may be any suitable user device as detailed herein.

Figure 4:
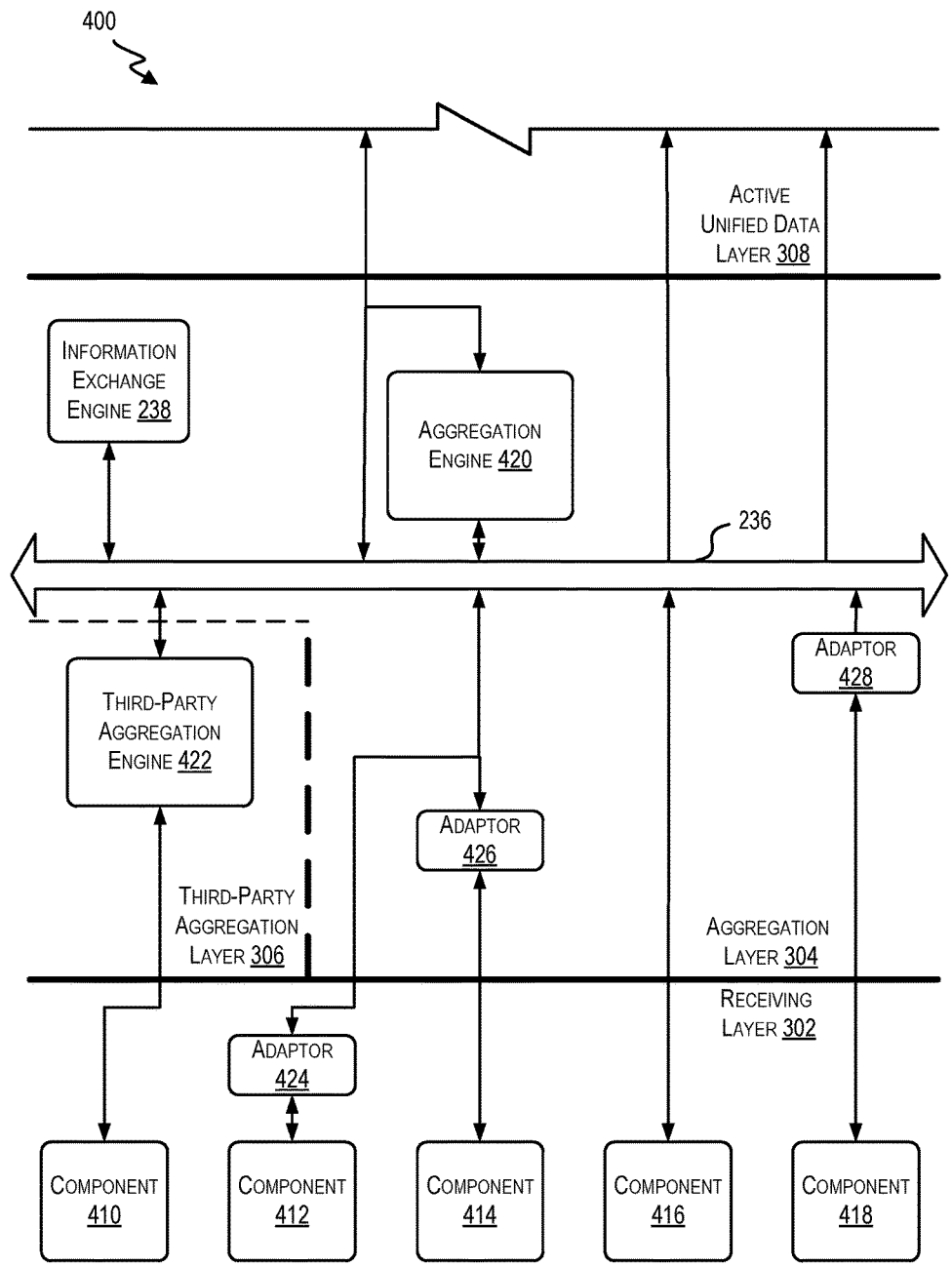
FIG. 4 is an example schematic model illustrating an aspect of the network communication model of FIG. 3 in more detail.

Turning next to FIG. 4, a diagram 400 is shown that depicts a portion of architecture stack 300 according to at least one embodiment. In particular, the diagram 400 includes receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple facilities within a single or multiple clients. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data can then be transformed, translated, or otherwise adjusted before an aggregation engine 420 (e.g., aggregation engine 218) or a third-party aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors can function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to third-party aggregation engine 422.

Aggregation engine 420 and third-party aggregation engine 422 function in a similar manner. In some examples, third-party aggregation engine 422 is operated by a different entity than the entity that operates aggregation engine 420 and may belong to different clients or a different interaction system. This may be because the data collected by third-party aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the third-party aggregation engine 422, and some of components 410-418 and elements of active unified data layer 308.

The diagram 400 also includes the information exchange service bus 236 and the information exchange engine 238. As introduced herein, messages passing through the aggregation layer 304 can pass over the information exchange service bus 236. In this manner, the information exchange engine 238 can access the messages, route the messages, and/or customize the messages.

Figure 5:
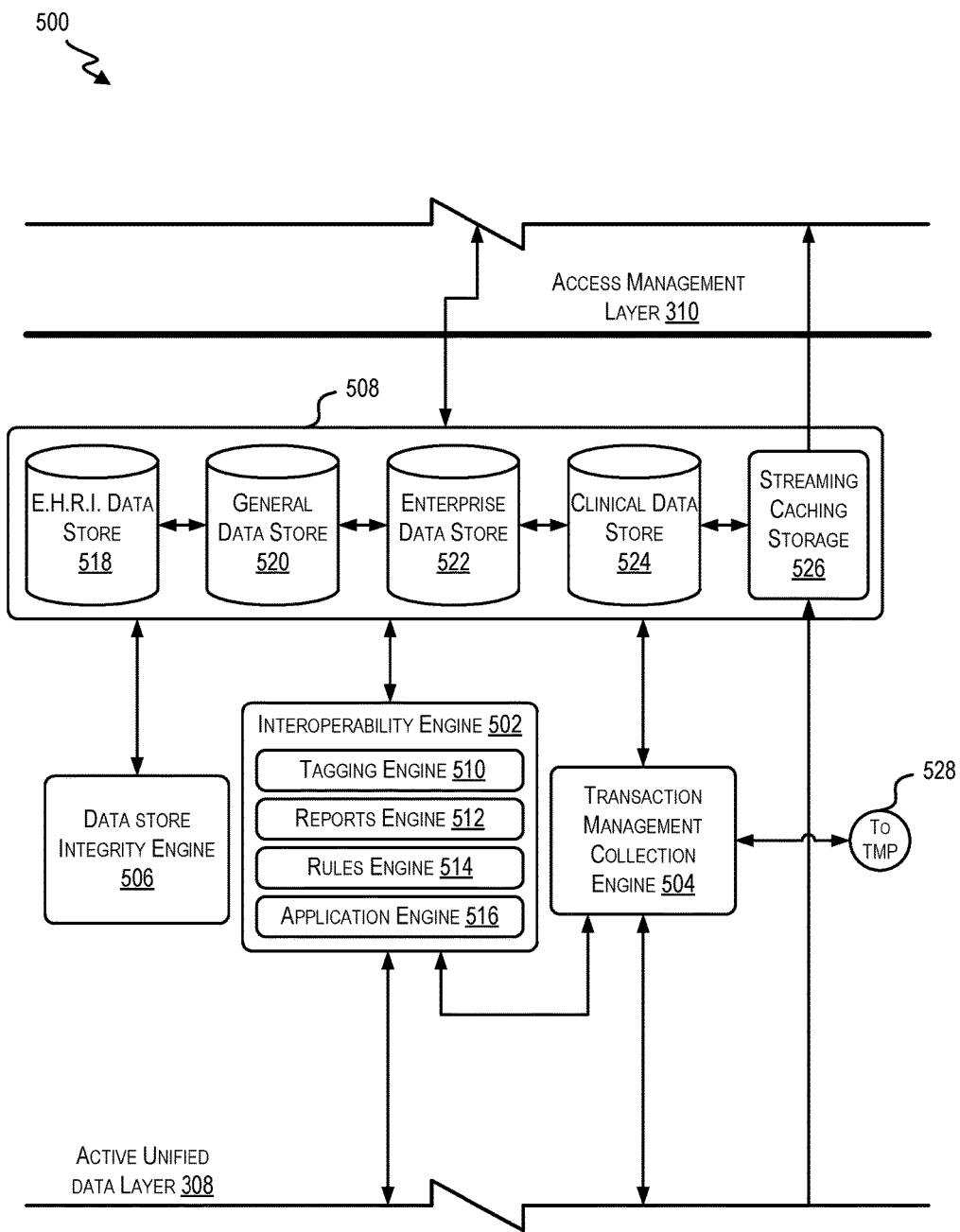
FIG. 5 is an example schematic model illustrating an aspect of the network communication model of FIG. 3 in more detail.

Referring next to FIG. 5, a diagram 500 is shown that depicts a portion of architecture stack 300 according to at least one embodiment. In particular, diagram 500 includes active unified data layer 308 and a portion of access management layer 310. Active unified data layer 308, as illustrated in diagram 500, includes an interoperability engine 502 (e.g., interoperability engine 220), a transaction management collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Transaction management collection engine 504 is implemented as part of transaction management engine 106. Transaction management collection engine 504 is configured to generate message indicators identifying flows of data by and between elements of an interaction system implemented using the techniques described herein. The flows of information include messages which include data, and the message indicators include unique message identifiers that can be used to identify the messages. The unique message identifiers include information that can be used to uniquely identify the messages. For example, a unique message identifier for a particular message can include a concatenation of the following information stored in a table: a source application, a facility, a message type, and a message control identification (ID). The unique message identifier can also be the message control ID. The unique message identifier may be created as messages including data are transmitted from aggregation layer 304.

In some examples, the table also includes information for tracking the progress of the message from an origination node to a destination node. For example, typically when a message (e.g., any communication of data) is first received by transformative processing engine 108 (e.g., interoperability engine 502), transaction management engine 106 (e.g., transaction management collection engine 504 of transaction management engine 106) may generate a unique identifier for the message in order to track that message as it moves throughout the interaction system. The unique identifier may be included in the header of the message such that when the next node (e.g., component, device, server, etc.) after transformative processing engine 108 receives the message, that node can report back to transaction management engine 106 that it saw the message. In this manner, transaction management engine 106 may enable end-to-end tracking of messages for the life of the message.

In one example, the messages are requests. The requests may be generated based om user input at one of the components. The requests may be received by transformative processing engine 108 and integrated into the system. In some examples, transaction management engine 106 may be notified that the requests have been received and may therefore be configured to generate message IDs for each request. These message IDs may then be associated with each of the requests. As the requests continue to move throughout the interaction system (e.g., away from transformative processing engine 108), transaction management engine 106 may be track their movement using the message IDs. If one of the requests does not make it to its destination, transaction management engine 106 may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, transaction management engine 106 (e.g., transaction management collection engine 504 of transaction management engine 106) may receive the message and/or message identifier directly from one of components 410-418. For example, one of components 410-416 may be configured to generate the unique message identifier and/or communicate directly with transaction management engine 106. The message also may travel via one or more intermediate nodes on its way to the destination node. In some examples, a node is a component such as components 410-418, which may be running an application. In some examples, the unique identifier and the routing of the message to its destination may be stored in a table that also includes: a geolocation of each node, a network from which the message originated, a type of node, the unique node identifier, and a time associated with the message leaving the origination node. In some examples, transaction management collection engine 504 provides unique message identifiers to other elements of the interaction system to monitor the messages as they move throughout the interaction system. Transaction management collection engine 504 also provides a portion of the unique message identifiers to a transaction management platform (indicated by a circle 528) for further analysis of the message identifiers. Such analysis may include reconciliation of lost messages, latency reporting, audit management and compliance, and other such analyses.

As mentioned previously, interoperability engine 502 is configured to store data in data store 508. A plurality of sub-engines 510-516 of interoperability engine 502 are configured to perform operations relating to storing data in data store 508.

Interoperability engine 502 includes a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by outside third-party mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against (e.g., to identify that the author's name corresponds to Dr. Brown who is an oncologist). Other examples, of metadata that may be included in one or more fields include author, document type, creation time and date, last update time and date, upload time and data, geographic location, unique ID associated with the client or facility where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may involve filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words (e.g., tagging a record with "cancer" upon detecting words such as tumor, metastasize, chemotherapy, radiation, oncology, malignant, stage 3, etc.). In this manner, tagging engine 510 may also index portions of the data within one or more data stores of data store 508. In some examples, such indexing may be based in part on the selected tags.

Interoperability engine 502 also includes a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications can include, for example, signals, sirens, electronic notifications, popups, emails, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also includes a rules engine 514 configured to create and manage business rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 includes an application engine 516 configured to provide service-oriented architecture web services.

Data store 508 includes an electronic record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 can include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data can then be formatted, filtered, sorted and/or processed and then stored, presented and/or otherwise used. In this manner, the script can be used to produce streaming analytics.

In some instances, the data query script, when executed, identifies each of the data stores of interest. Identifying the data stores of interest involves identifying at least a portion of data from the data stores simultaneously and/or sequentially. For example, the script can identify corresponding data stores (e.g., or components of a single data store or multiple data stores) that pertain to one or more similar variables but that differ in one or more other variables. Once the portion of the data from the data stores is identified, a representation of the identified data can be output to one or more files (e.g., Extensible Markup Language (XML) files) and/or in one or more formats. Such outputs can then be used to access the data within one or more relational database accessible using Structured Query Language (SQL). Queries made using SQL can be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, includes individually identifiable information. But it may also include de-identified information.

Within general data store 520 is retained data. The data may be stored in a relational database format or in any other suitable format. Thus, the data within general data store 520 may be retained in a data structure that includes one or more tables capable of accessing each other. In some examples, general data store 520 includes a subset of the information that is included in operational data store 522.

Within operational data store 522 is retained data in a relational database format. Thus, the data within operational data store 522 may be retained in a data structure that includes one or more data structures (e.g., tables) capable of accessing each other. Operational data store 522 is an example of an operational data warehouse. In operational data store 522 is joined many different types of data. In some examples, the operational data store 522 includes data pertaining to decision making as discussed herein and other data typically used by conventional business concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, transactional, secure, database server with built-in search and a full suite of application services. An example of such a unified system may be Marklogic. Entity-based data store 524 can support data aggregation, data organization, data indexing, data tagging and mapping to semantic standards, concept matching, concept extraction, machine learning algorithms, concept discovery, concept mining, and transformation of personal record information. In some examples, entity-based data store 524 includes data pertaining to decision making (similar to general data store 520) as discussed that is organized and accessed in a different manner. For example, the data within entity-based data store 524 may be optimized for providing and receiving information over one or more information exchanges. In some examples, entity-based data store 524 includes a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data can be cached. For example, assume that component 418 is a piece of equipment operating at Location A and that a user using a computer in Location B desires to view a live of substantially live stream of outputs of the piece of equipment. Component 418 can send a portion of data to streaming caching storage 526 which can retain the portion of the data for a certain period of time (e.g., 1 day). Thus, streaming caching storage 526 is configured to cache data that can be streamed.

Diagram 500 also includes data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
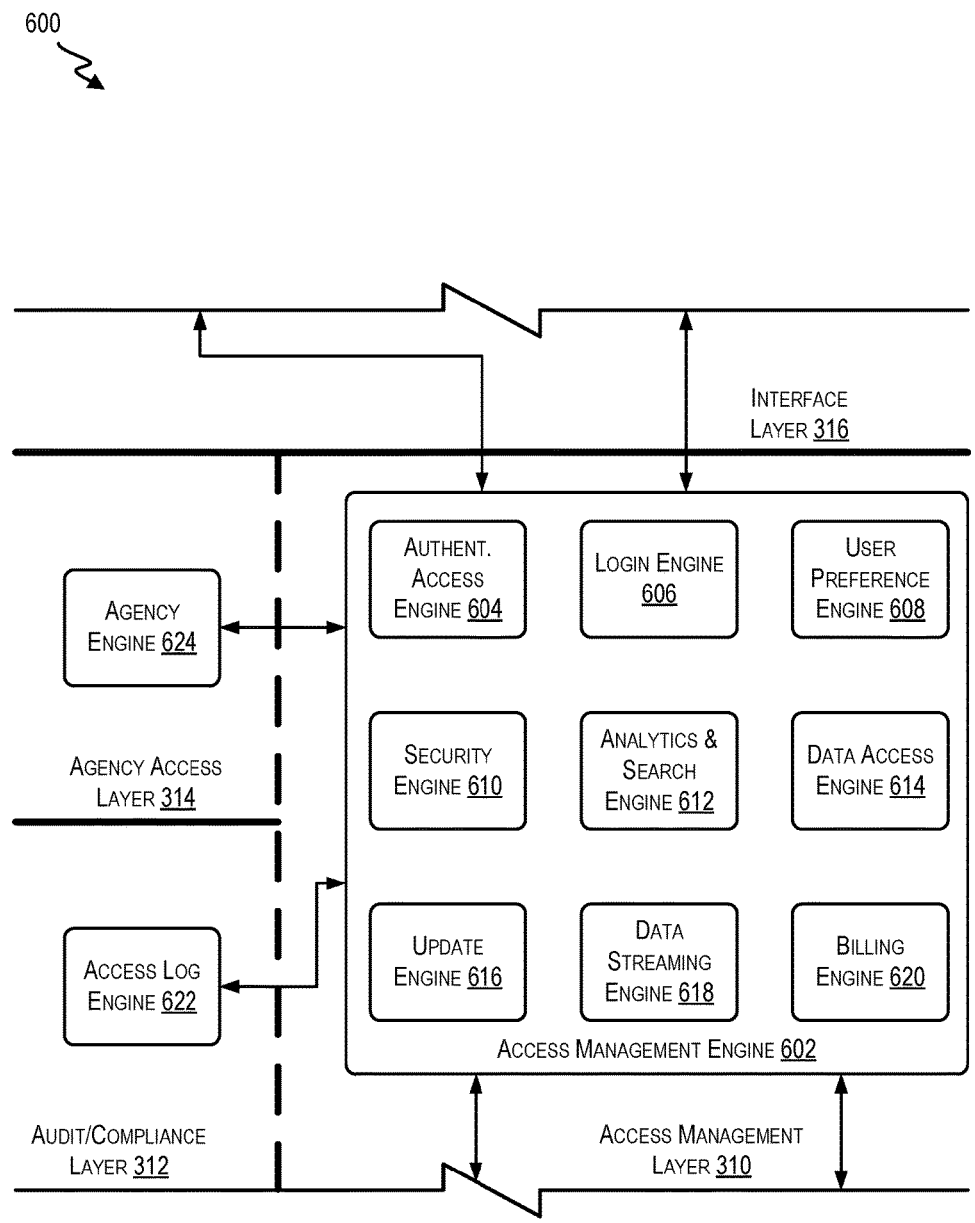
FIG. 6 is an example schematic model illustrating an aspect of the network communication model of FIG. 3 in more detail.

FIG. 6 shows a diagram 600 which depicts a portion of architecture stack 300 according to at least one embodiment. In particular, the diagram 600 includes access management layer 310, audit/compliance layer 312, agency layer 314, and a portion of interface layer 316.

Access management layer 310, as illustrated in the diagram 600, includes an access management engine 602. Access management engine 602 is an example of access management engine 222. Generally, access management engine 602 can be configured to manage access to elements of transformative processing engine 202 by different components, applications, and user devices.

Access management engine 602 within access management layer 310 also provides functionality similar to an operating system. For example, access management engine 602 includes a plurality of engines configured to manage different aspects of interacting with elements of the interaction system. For example, a user who desires to access portions of data retained in data store 508, may do so by interacting with access management engine 602 using one or more applications (not shown). Thus, access management engine 602 includes a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access management engine 602 can define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 can confirm that an entered username (e.g., and password), provided biometric data or code or identifier in a scanned tag or badge matches that in an authorized user data structure.

Login engine 606 evaluates one or more user profiles associated with each authenticated user. In some examples, a user profile includes a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Security engine 610 evaluates the rules and conditions for ensuring the security of access to the elements of the interaction system. In some examples, these rules and conditions are determined by administrators of the interaction system. In some examples, security engine 610 provides a plurality of computer virus protection services. These services can be called up and implemented when accessing the interaction system or accessing applications associated with the interaction system. The rules and conditions may be based on roles, based on profiles, based on domains, and any other suitable security configuration. For example, because the interaction system may include sensitive data, security engine 610 may enforce a domain-based rule that protects certain sensitive information (e.g., identifying information).

Analytics and search engine 612 evaluates the rules and conditions under which users can search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 can be used to search within various fields and potential field values. In some examples, search engine 612 can provide analytics, such as statistics, graphs, distributions, and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may manage which users can access parts of the interaction system, data access engine 614 may manage how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access management engine 602) may be provided to developers in the form of a software development kit (SDK). SDKs may enable developers write applications that can effectively communicate with elements (e.g., data store 508) of the interaction system. In particular, applications that can access a portion of the data stored within active unified data layer 308.

Update engine 616 evaluates the rules and conditions for providing updates to other engines within access management engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access includes, in some examples, logging data conventionally collected by access log engines running in similar environments. Access log engine 622 can use this data to generate and transmit reports, for example, to stakeholders of the interaction system such that they can make informed decisions regarding that is accessing the interaction system and for what purposes.

Within agency layer 314 is located an agency engine 624. Agency engine 624 evaluates the rules and conditions under which agencies can access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 can identify one or more entities (e.g., governmental agencies) that are to receive reports pertaining to operations or events and what types of data are to be reported to those entities. Agency engine 624 can then collect the pertinent data, potentially format and/or analyze the data, and facilitate transmission of (e.g., raw, formatted and/or analysis of) the data to the appropriate agency.

Figure 7:
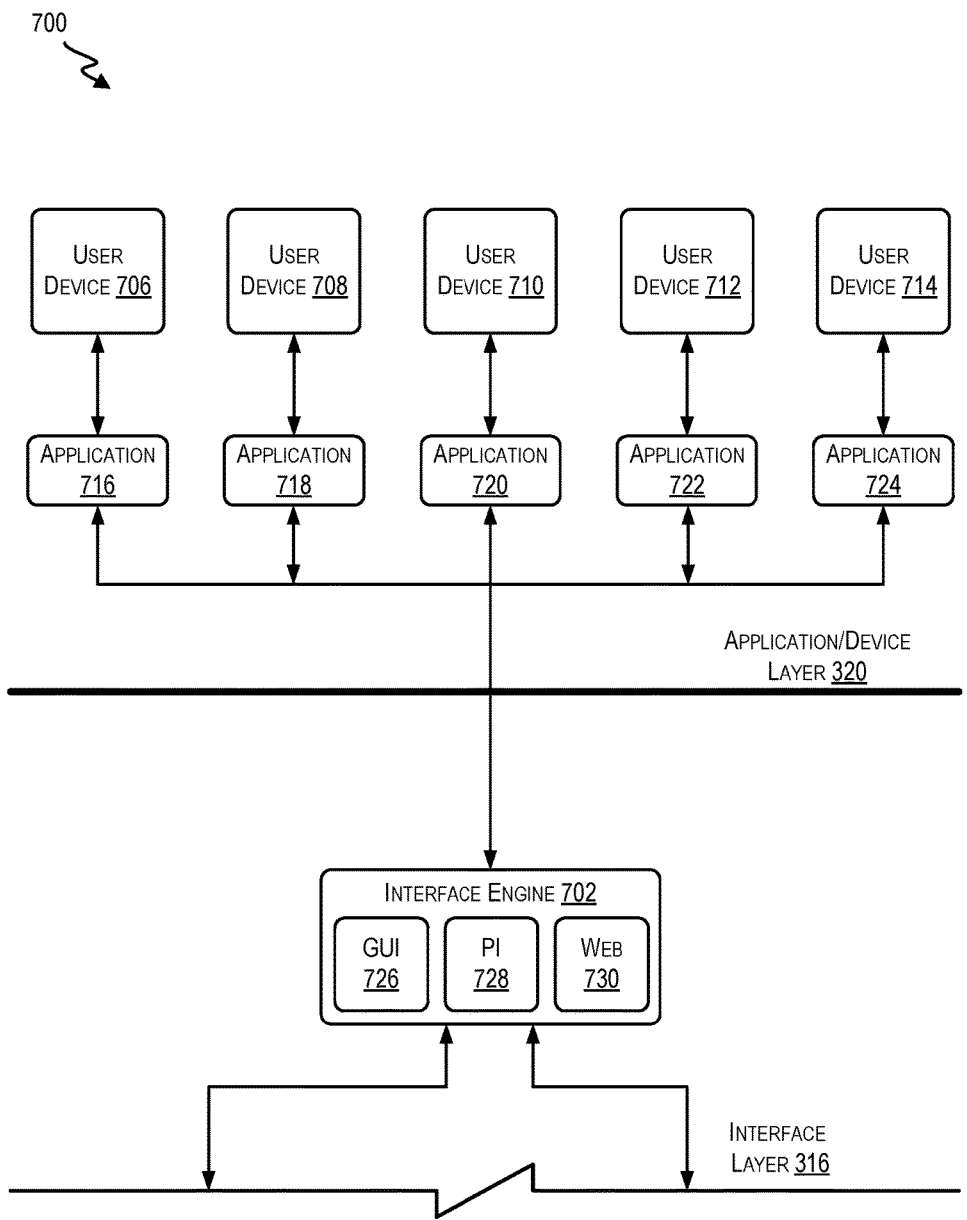
FIG. 7 is an example schematic model illustrating an aspect of the network communication model of FIG. 3 in more detail.

FIG. 7 shows a diagram 700 which depicts a portion of architecture stack 300 according to at least one embodiment. In particular, diagram 700 includes interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access management layer 310 may be embodied.

Graphical user interface 726 is any suitable graphical user interface configured to interact with elements of the interaction system. Programmatic interface 728 includes an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive user input, present dynamic presentations that depend on user input, and otherwise respond to user input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This includes detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 706-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that can be designed for particular users and/or uses. In one example, application 720 includes dashboards, widgets, windows, icons, and the like that are customized for a particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for nurses or types of nurses. In this example, application 722 may include dashboards, widgets, windows, icons, and the like that are customized to individual nurses. Similar to the example discussed above pertaining to the user, in some examples, application 724 may present different data depending on a position of the nurse. In this manner, application 722 adapts and automatically adjusts depending on the context in which the nurse is using the application. For example, the nurse may receive data, such as test results.

In some examples, application 724 may be a multi-role application for administrators and is used to manage entities constitute the population of the entities or organizations within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 can provide different data depending on the role of the user. For example, whether data presented includes identifiable or de-identified information may depend on a position of the user.

In some examples, application 724 may be a business intelligence application. In this example, application 724 is used to display business information generated by components of the interaction system. This business information can be used for operations, planning, and forecasting. Such business information may include data because such data may impact operations, planning, forecasting, and the like. Accordingly, application 724 may present de-identified information in the form of one or more metrics, indicators, or the like as they pertain to business intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
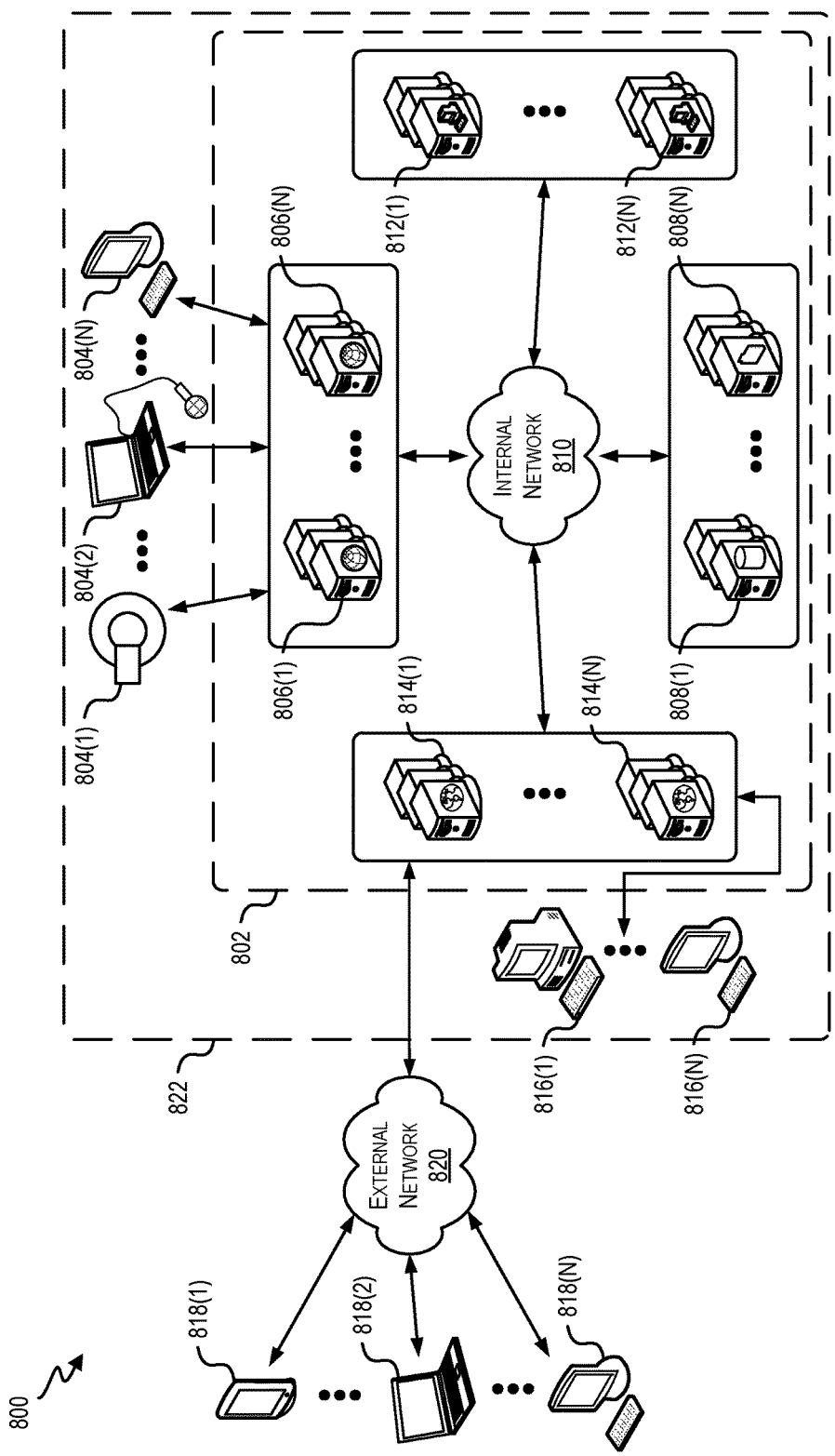
FIG. 8 is an example schematic architecture illustrating an interaction system, according to at least one embodiment.

Turning now to FIG. 8, an interaction system 800 is shown according to at least one embodiment. Interaction system 800 includes an internal organization 822 including a transformative processing engine 802. The transformative processing engine 802 is an example of transformative processing engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal organization 822 includes generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access management servers 812(1)-812(N) manage access to the data retained in the data storage servers 808(1)-808(N). Access management servers 812(1)-812(N) communicate with the other elements of interaction system 800 via internal network 810 and in accordance with access management layer 310.

Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N)

can be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) can run applications developed by third parties that access the other elements of interaction system 800 via the interfaces generated by interface servers 814(1)-814(N).

External user devices 818(1), 818(2), and 818(N) access the interfaces via external network 820. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Figure 9:
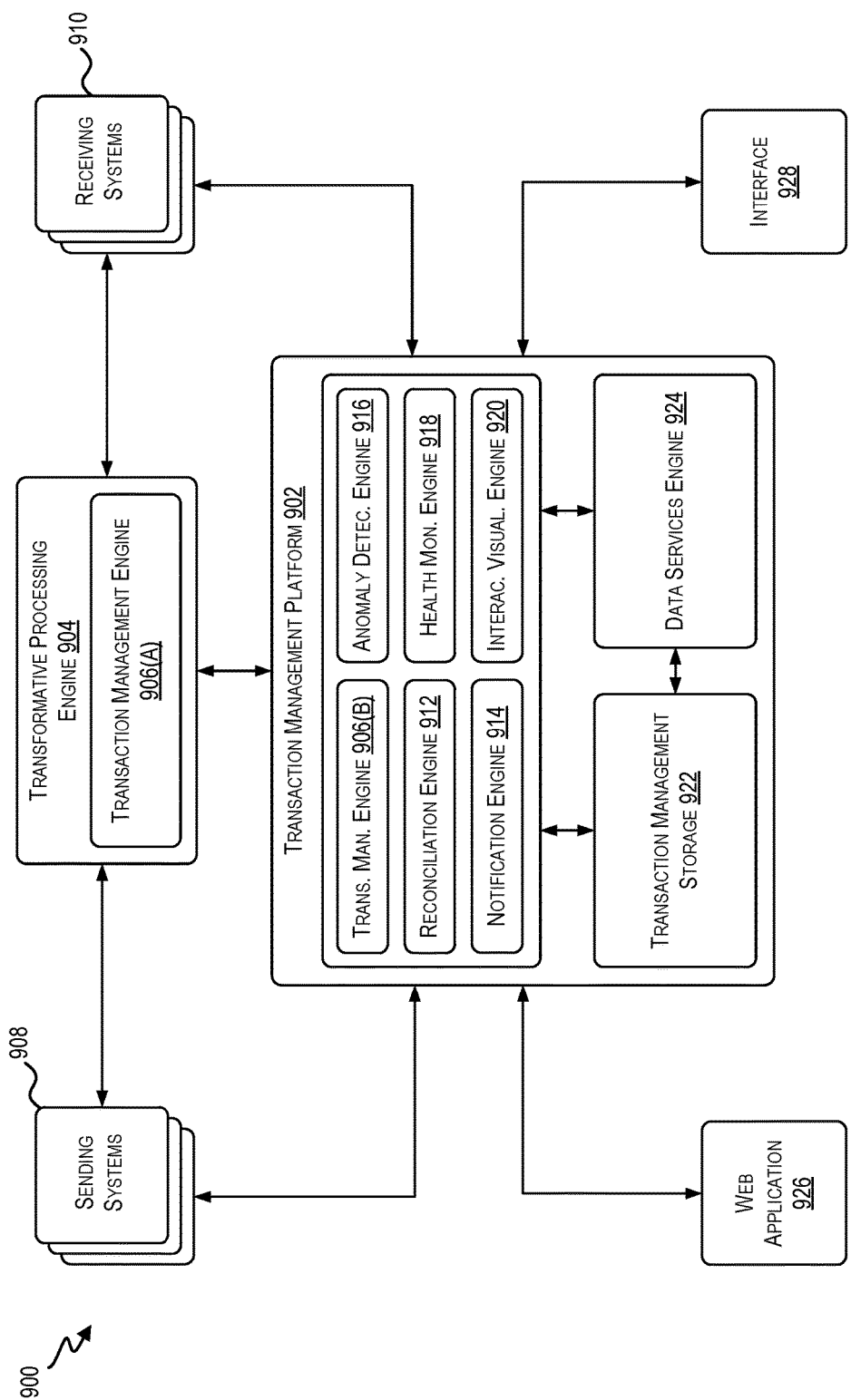
FIG. 9 is an example block diagram illustrating a message tracking architecture, according to at least one embodiment.

FIG. 9 illustrates a block diagram of a message tracking architecture 900 in accordance with an embodiment of the present disclosure. The message tracking architecture 900 includes the transaction management platform 902. The message tracking architecture 900 may be implemented using at least some of the elements of the network 800. For example, the transaction management platform 902 is an example of the transaction management platform 528 discussed herein. The message tracking architecture also includes transformative processing engine 904, which is an example of the transformative processing engine 108. The transformative processing engine 904 includes a transaction management engine 906(A). The transaction management platform 902 also includes a transaction management engine 906(B). The transaction management engines 906(A), 906(B) are examples of the transaction management engine 106 discussed herein. The transaction management engines 906(A), 906(B) are configured to track messages using universal message identifiers as discussed herein.

Sending systems 908 are configured to provide data to receiving systems 910. In some examples, the data moves in the form of one or more messages via the transformative processing engine 904 and/or the transaction management platform 902. The sending systems 908 include any suitable computing system used in a network to generate and/or process data. Examples of the sending systems 908 include clinical data systems, electronic medical record services, data centers, servers, computers, medical devices, and any other suitable component, such as the generation component 106 or the user device 104 capable of generating and/or processing data. In some examples, the elements of the transaction management platform 902 may be considered nodes of a network. In this example, the sending systems 908 may be considered source nodes and/or origination nodes. The sending systems 908 may be source nodes because data is originating at the sending systems 908 as it moves throughout the network.

The receiving systems 910 are configured to receive data from the sending systems 908. In some examples, the data is received via the transformative processing engine 904 and/or the transaction management platform 902. The receiving systems 910 include any suitable computing system used in a network to receive and/or process data. Examples of the receiving systems 910 include clinical data systems, electronic medical record services, data centers, servers, computers, medical devices, and any other suitable component, such as the generation component 102 or the user device 104 capable of receiving and/or processing data. In some examples, the elements of the transaction management platform 902 may be considered nodes of a network. In this example, the receiving systems 910 may be considered destination nodes or pathway nodes. The receiving systems 910 may be destination nodes at least because data is received by the receiving devices 910 as it moves throughout the network. The receiving systems 910 may be pathway nodes at least because medical related data is passed between some of the receiving systems 910 before ending at one or more of the receiving systems 910.

In some examples, the transformative processing engine 904 is an enterprise level integration engine and may be configured to receive data from a variety of different sources (e.g., the sending systems 908) and make such data available to other engines and services associated with the message tracking architecture 900. The transaction management engine 906(A) may be associated with the transformative processing engine 904 such that when the data (e.g., messages) is received by the transformative processing engine 904, the transaction management engine 906(A) may access that data to generate corresponding universal message identifiers for tracking the data (e.g., messages) within a network. The universal message identifiers, which may be referred to herein as message tracking information, may be provided to the transaction management platform 902. The transaction management platform 902 includes a variety of engines, services, and storage elements configured to track movements of messages, using the universal message identifiers, throughout a network.

The transaction management platform 902 includes the transaction management engine 906(B), a reconciliation engine 912, a notification engine 914, an anomaly detection engine 916, a health monitor engine 918, and an interactive visualization engine 920. In some examples, each of the engines of the transaction management platform 902 includes software and/or hardware that is configured to implement the message tracking techniques described herein. The engines are provided as examples, and it is understood that more or fewer engines may perform the operations described herein. The transaction management engine 906(B) is configured to receive messages and/or indications of messages from the sending systems 908. In some examples, the transaction management engines 906(A) and 906(B) perform similar roles. In any event, once a message is received, the transaction management engine 906(B) generates a universal message identifier that is unique to the message. The universal message identifier may be a hexadecimal, hexadecimal, or any other suitable combination of letters, numbers, symbols, and the like.

The transaction management engine 906(B) generates a record for the message and associates the universal message identifier with the record and stores the record in the transaction management storage 922. As described in more detail herein, the record may include various types of data that are particular to the message. The transaction management storage 922 may include any suitable number of data stores or other suitable storage devices. The transaction management engine 906(B) also includes the universal message identifier with the message. This may include altering the message to include the universal message identifier. For example, the transaction management engine 906(B) may include the universal message identifier in the header of the message. Instructions may also be included in the header of the message in association with the universal message identifier. In some examples, the universal message identifier and/or the instructions may instruct later nodes to report back to the transaction management platform 902 once the message is received. For example, once a particular receiving system of the receiving systems 910 receives the message, the particular receiving system provides a message back to the transaction management platform 902. The transaction management platform 902 then updates the record associated with the message that is stored in the transaction management storage 922.

The reconciliation engine 912 is configured to generate data that can be used to help an administrator or other authorized user to reconcile lost messages, account for latency in messages as they move throughout a network, and any other suitable reconciliation process. In some examples, the reconciliation engine 912 generates a list of nodes that need to be reconciled. For example, some nodes may not be transferring information (e.g., messages). This list can be sorted and prioritized based on message type, date, location, application, etc. In this manner, an authorized user will be informed as to which nodes need the most immediate attention and which nodes can be dealt with another day.

The notification engine 914 is configured to generate notifications regarding the generation of universal message identifiers and tracking of messages. The anomaly detection engine 916 is configured to implement techniques related to anomaly detection as described herein. For example, the anomaly detection engine 916 may be configured to estimate an expected quantity of messages for a particular node. The anomaly detection engine 916 may therefore be configured to access historical data representative of historical message transactions. This historical data can then be used by the anomaly detection engine 916 to generate a baseline of how many messages, of what type, originating from which system and facility, and the like should be expected. The anomaly detection engine 916 may also be configured to monitor incoming messages, compare the quantity (and other characteristics) to the baseline, and determine whether the received/monitored messages are anomalous for a given time period.

The health monitor engine 918 is configured to monitor the health of components of the network. These components may include any suitable device of the network that is capable of sending and/or receiving data. In some examples, the health monitor engine 918 is configured to monitor the health of a few major components of the network. For example, the transformative processing engine 904 and other similar engines and/or devices may be monitored by the health monitor engine 918. Monitoring a component by the health monitor engine 918 may include monitoring operational characteristics of the component and alerting an authorized user when the operational characteristics exceed or drop below a threshold. The operational characteristics may relate to the messages and may be monitoring using the universal message identifiers.

The interactive visualization engine 920 is configured to generate one or more graphical diagrams that can be presented on user interfaces, such as interface 928. In some examples, the interactive visualization engine 920 generates graphical diagrams based on movements of messages within a network. For example, a graphical diagram may include a plurality of nodes connected with a plurality of chords. The color and intensity of the nodes and the chords may be adjusted based on changes tracked by one of the other engines of the transaction management platform 902. Any of the information generated by the transaction management platform 902, including any output, may be provided to the interface 928 and/or web application 926.

The transaction management platform 902 may also include a data services engine 924. The data services engine 924 may be configured to provide one or more services in a service-oriented architecture. For example, the data services engine 924 may enable other components to access to the transaction management platform 902.

Figure 10:
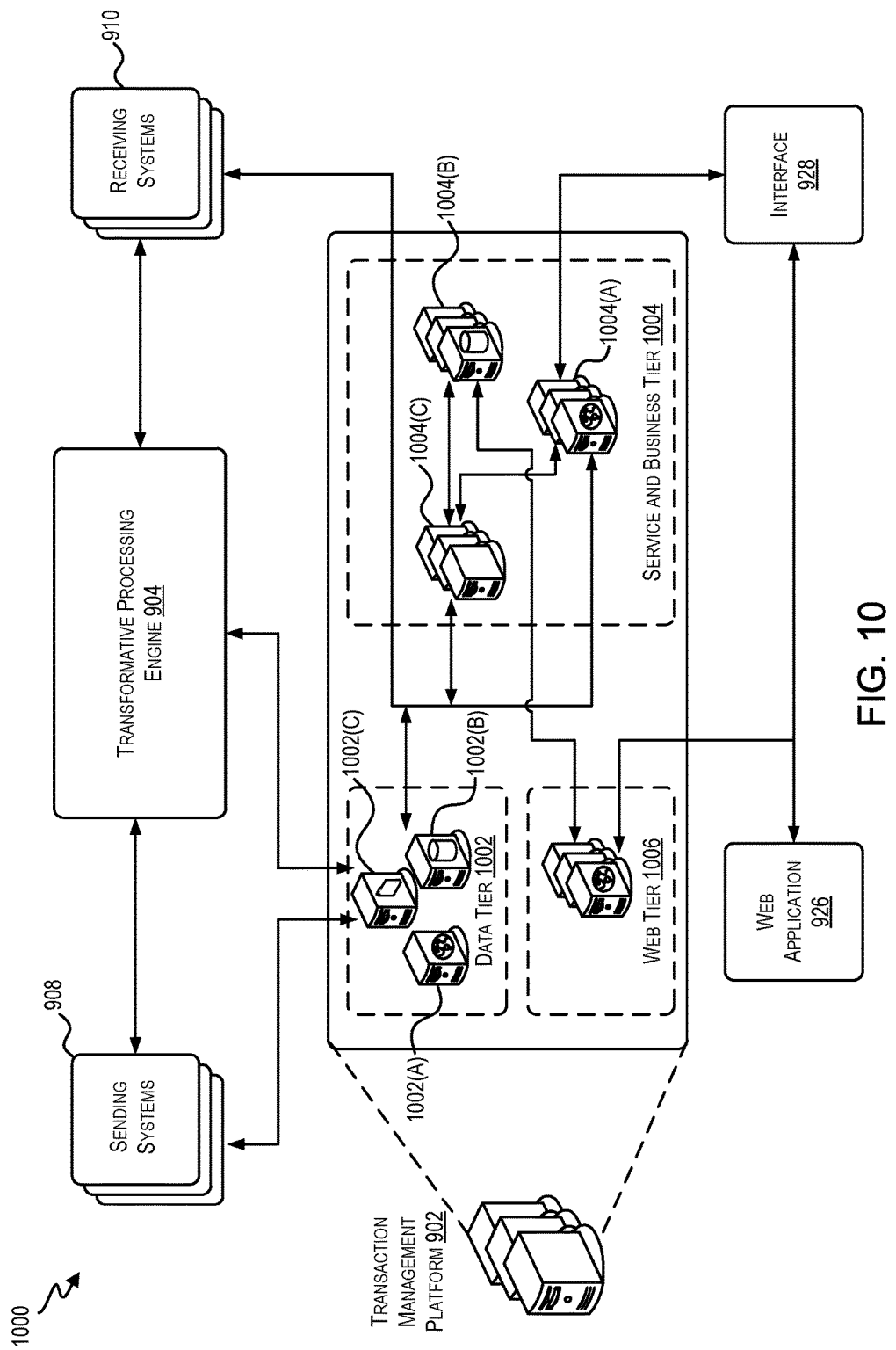
FIG. 10 is an example block diagram illustrating a network, according to at least one embodiment.

FIG. 10 illustrates a network 1000 in accordance with at least one embodiment of the present disclosure. The network 1000 includes the transaction management platform 902, the transformative processing engine 904, the sending systems 908, the receiving systems 910, the web application 926, and the interface 928 previously discussed. In this figure, however, details about the architecture of the transaction management platform 902 are illustrated in greater detail. The transaction management engine 906(B), the reconciliation engine 912, the notification engine 914, the anomaly detection engine 916, the health monitor engine 918, the interactive visualization engine 902, the transaction management storage 922, the data services engine 924, and any other engine, service, or module of the transaction management platform may be distributed between a data tier 1002, a service and business tier 1004, and a web tier 1006 of the transaction management platform 902. In some examples, more or fewer tiers are included as may be appropriate to implementing the message tracking techniques described herein. The data tier 1002 may include one or more computer systems configured to manage the data that is received, monitored, collected, and generated as part of implementing techniques related to message tracking. The data tier 1002 may therefore include a web server 1002(A), a data storage server 1002(B), and a file server 1002(C). The data tier 1002 may be configured to receive data in the form of messages from the sending systems 908 and the transformative processing engine 904. Within the data tier 1002, the universal message identifiers are generated and associated with the messages.

From the data tier 1002 data flows to the service and business tier 1004, and in some examples, to the receiving systems 910. The service and business tier 1004 includes one or more computer systems configured to provide services via the interface 928 and to manage other aspects of implementing techniques relating to message tracking as described herein. For example, within the service and business tier 1004 may reside the software and/or hardware configured to perform anomaly detection. As illustrated, the service and business tier 1004 may include a web server 1004(A), a data storage server 1004(B), and a generic server 1004(C). From the service and business tier 1004, the data, including indications (e.g., universal message identifiers), is provided to the web tier 1006. The web tier 1006 may include a web server 1006(A) and may be configured to provide access to at least a portion of the data generated within the transaction management platform. In particular, the web tier 1006 may be accessed via the web application 926.

Turning now to FIG. 11, in FIG. 11 is illustrated table 1100. The table 1100 may be configured to include a record for each message that is received by the transaction management platform 902. Thus, the table 1100 may include a plurality of rows and columns, and each row of the table 1100 may correspond to a record for a different message. The table 1100 includes a time created column 1104, a source application column 1106, a facility column 1108, a message type column 1110, a message control identification column 1112, and tracking columns 1114, and 1116. The data in the time created column 1104 indicates a time that each message was created. The data in the source application column 1106 indicates the application from which each message originated. The data in the facility column 1108 indicates a facility where each message was created. The data in the message type column 1110 indicates a message type of each message. The message type may include any suitable message type used for transferring data. For example, the message types may be medical record, medical document, radiology orders, pharmacy orders, lab results, home medications, emergency room documents, observation results, patient problems, admissions/discharges, nursing documents, electronic medication, and any other suitable message type. The data in the message control identification column 1112 defines the source, purpose, destination, and certain syntax specifics like delimiters (separator characters) and character sets for each message. The data in the tracking columns 1114, 1116 are used to track the movements of the messages. For example, as each row corresponds to one message (or group of messages) that has been received and recorded by the transaction management platform 902, the entry (i.e., "Y") in the tracking column 1114 for a first row 1102 indicates that a first message was identified at the source node (e.g., "@Src"). Similarly, at the tracking column 1116 and the first row 1102 there is no entry. This may indicate that the first message has not made it to the node identified by "CL," which may be the next node after the source node, or may be some other node. The column entries within the row 1102 may therefore correspond to the first message. Any or all of the column entries within the row 1102 may be found or added to the header of the first message.

In some embodiments, the table 1100 may include more columns than are illustrated. For example, for a message that is required to go through many different nodes to reach its destination there may be more tracking columns to account for the additional nodes. Furthermore, information corresponding to a received time, a sent time, and a duration (e.g., sent time minus received time) may be included in the row 1102. As different nodes are queried by the transaction management platform 902, information corresponding to different nodes may be created, modified, and/or updated within the row 1102. Accordingly, the record for each message may be periodically updated based on queried information.

The column entries in the source application column 1106, the facility column 1108, the message type column 1110, and the message control identification column 1112 may be concatenated together to create a universal message identifier for the first message. In some examples, other information is used to generate universal message identifiers. In some examples, the universal message identifier is generated and included in the table 1100, which is then saved. For example, for the first message (shown in the first row 1102), the universal message identifier may include the concatenation of the entries from the columns discussed above. The table 1100 may therefore include universal message identifiers for more than one message.

Figure 12:
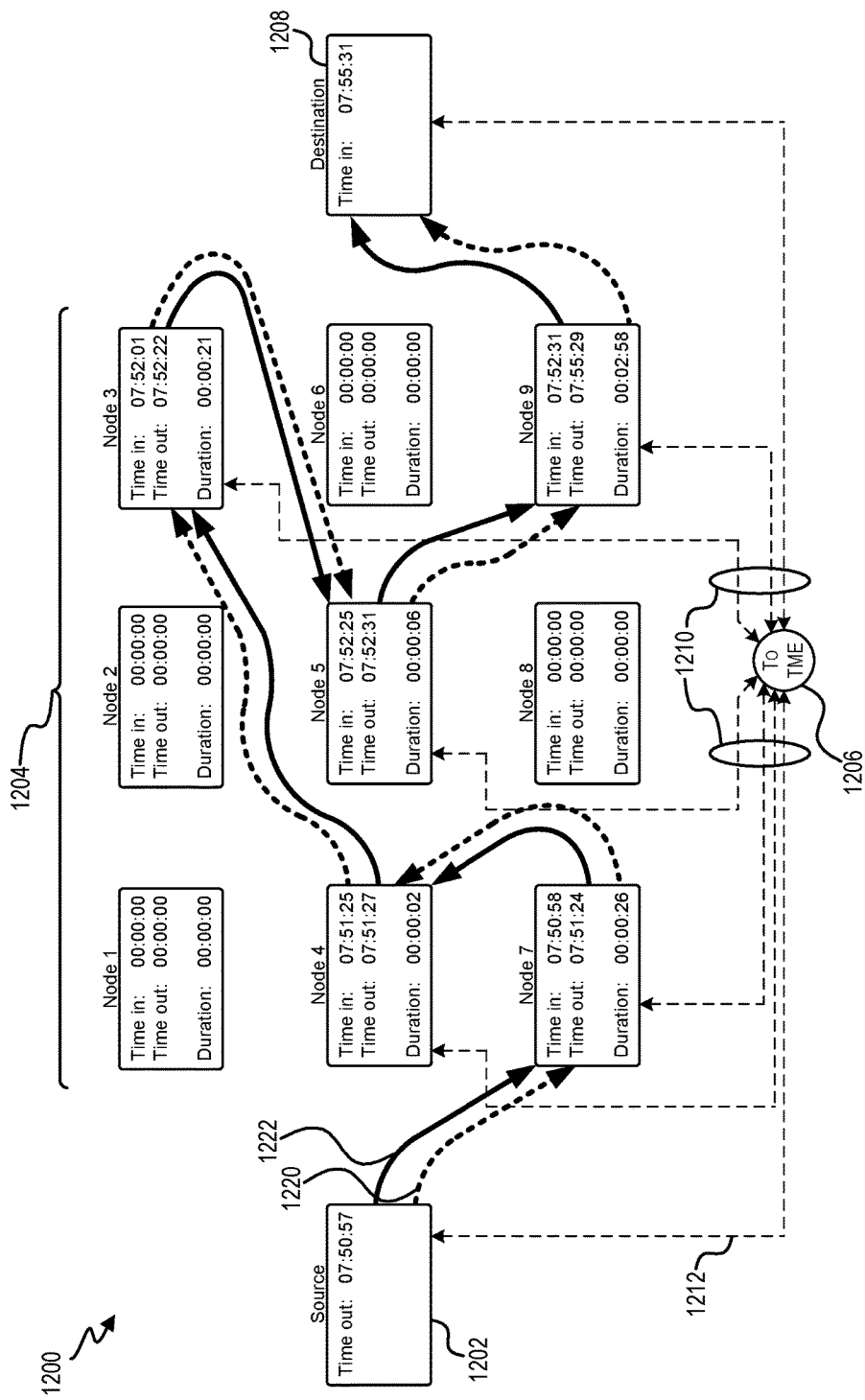
FIG. 12 is an example block diagram illustrating a network, according to at least one embodiment.

Turning next to FIG. 12, in FIG. 12 a network 1200 is illustrated in accordance with at least one embodiment of the present disclosure. The network 1200 may include a source node 1202, a plurality of regional nodes 1204 (e.g., node 1, node 2, etc.), and a destination node 1208, each of which may be queried by a transaction management engine (indicated by a circle 1206). For example, in at least one embodiment of the present disclosure, the transaction management engine may send a plurality of queries 1210 to the various nodes requesting information about message statuses for one or more messages. The transaction management engine may send an initial query 1212 to the source node 1202 requesting a message list that includes information about all or some portion of the messages originating from the source node 1202. The initial query may request the message list in its entirety or some subset of the message list.

Based on the received message list, the transaction management engine may generate a universal message identifier for each of the messages in the message list, and may generate and/or store a record for each of the messages in the message list that includes the corresponding universal message identifier. The transaction management engine may also identify a message type for each of the messages in the message list. When the record for a particular message is initially generated and/or stored, the record may only include information corresponding to the source node 1202 and may be devoid of information regarding the regional nodes 1204 and the destination node 1208. In some instances, the message list includes information corresponding to the destination node 1208 for each message in the message list. For example, the message list may include information corresponding to the destination node 1208 for a particular message but may not include information about which regional nodes 1204, if any, the particular message will travel through in order to reach the destination node 1208.

In some embodiments, a predicted path for each of the plurality of messages is determined based in part on the respective message type and the message list. For example, a predicted path 1220 may be determined for a particular message which may be similar or different than an actual path 1222 taken by the particular message within the network 1200. The predicted path 1220 may include the source node 1202, one or more regional nodes 1204, and the destination node 1208, and may include arrival times, departure times, and/or durations associated with each node. For example, in the specific embodiment shown in FIG. 12, the predicted path 1220 is correctly aligned with the actual path 1222, and includes, in order, the source node 1202, node 7, node 4, node 3, node 5, node 9, and the destination node 1208.

The predicted path 1220 facilitates tracking of the movements of the particular message within the network 1200 by allowing the transaction management engine to send queries to each of the nodes in the predicted path 1220 requesting a message status. For example, after a predetermined amount of time after the particular message was sent by the source node 1202 (or after a predetermined amount of time after determining the predicted path 1220), the transaction management engine may send a query (e.g., one of queries 1210) to node 7, the next node in the predicted path 1220, requesting a message status. Upon receiving information indicating the message status, the transaction management engine may update the record for the particular message to reflect the message status. For example, the transaction management engine may update the received time (07:50:58), the sent time (07:51:24), and the duration (00:00:26) for node 7. Next, the transaction management engine may send a query (e.g., one of queries 1210) to node 4, the next node in the predicted path 1220, requesting a message status. Upon receiving information indicating the message status, the transaction management engine may update the record for the particular message to reflect the received time (07:51:25), the sent time (07:51:27), and the duration (00:00:02) for node 4. If no issues are detected, the transaction management engine may continue to send queries to node 3, node 5, node 9, and the destination node 1208.

In some instances, the predicted path 1220 may be determined based on an analysis of historical averages for a given message type. For example, the predicted path 1220 for a particular message having an ADT message type and originating from the source node 1220 may be determined by first collecting data for all previous messages having an ADT message type that originated from the source node 1220 and second performing a highest likelihood calculation. The highest likelihood calculation may include identifying the subsequent node with the highest likelihood based on the previous node. For example, node 7 may be the highest likelihood destination for ADT messages originating at the source node 1202, node 4 may be the highest likelihood destination for ADT messages originating at the source node 1202 and having passed through node 7, and node 3 may be the highest likelihood destination for ADT messages originating at the source node 1202 and having passed through node 7 and node 4.

Figure 13:
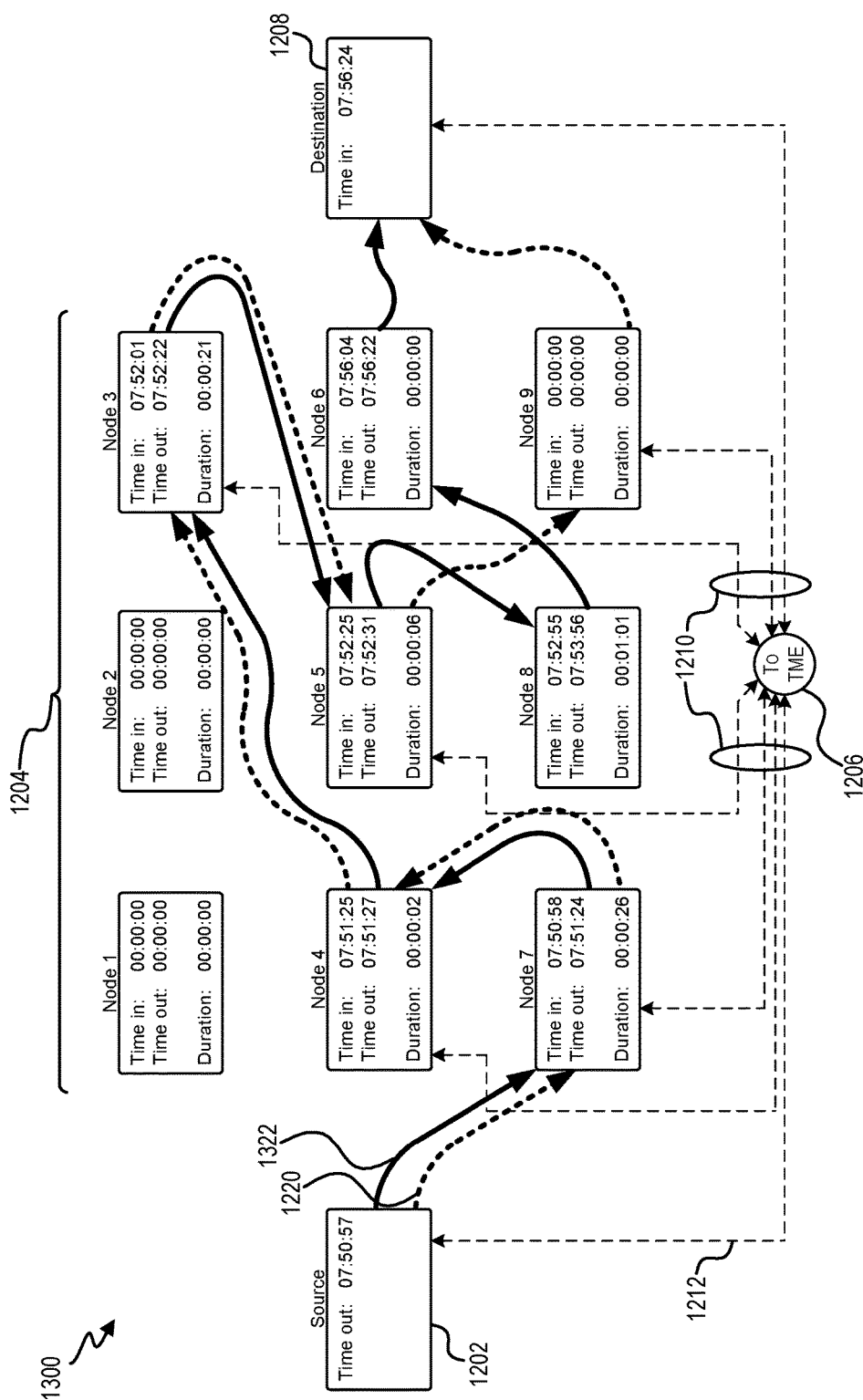
FIG. 13 is an example block diagram illustrating a network, according to at least one embodiment.

Turning next to FIG. 13, in FIG. 13 a network 1300 is illustrated in accordance with at least one embodiment of the present disclosure. Similar to the network 1200, the network 1300 may include the source node 1202, the plurality of regional nodes 1204, and the destination node 1208, each of which may be queried by a transaction management engine (indicated by a circle 1206). In some embodiments, a predicted path 1220 may be determined for a particular message which may be different than an actual path 1322 taken by the particular message within the network 1200. In the specific embodiment shown in FIG. 13, the predicted path 1220 includes node 9 whereas the actual path 1322 includes node 8 and node 6. The transaction management engine may send a query to node 9 requesting a message status for the particular message and may receive information indicating that the message was never received by node 9. In some embodiments, it may be determined that, after a predetermined amount of time, the message needs to be reconciled. In some embodiments, a second predicted path for the particular message may be determined. The second predicted path may be calculated using a second-highest likelihood calculation. For example, the second predicted path may represent the second-most likely path of the message given that the path includes the previous nodes that the message has already traveled through. In some embodiments, the second predicted path may align correctly with the actual path 1322.

In some instances, when it is determined that a node in the predicted path 1220 (e.g., node 9) is not part of the actual path 1322 that the message travels, the data used to determine the predicted path 1220 may be updated, and the predicted path 1220 may be recalculated/updated using the updated data. For example, the historical averages for a given message type may be constantly changing and therefore the historical averages initially used to determine the predicted path 1220 may be significantly different than the historical averages at the time when it is determined that the predicted path 1220 and the actual path 1322 are different. In some instances, the predicted path 1220 is updated only after determining the predicted path 1220 and the actual path 1322 are different, whereas in some embodiments the predicted path 1220 may be updated at set intervals despite no differences between the predicted path 1220 and the actual path 1322 being detected. For example, in some instances the predicted path 1220 is updated using updated historical averages every 10 ms, 100 ms, 1 s, and the like. In some embodiments, recent data is weighed more heavily than old data when updating historical averages. For example, in some embodiments, when the historical averages for a given message type are updated, only data within a certain threshold of time from the current time is used to update the historical averages.

Figure 14:
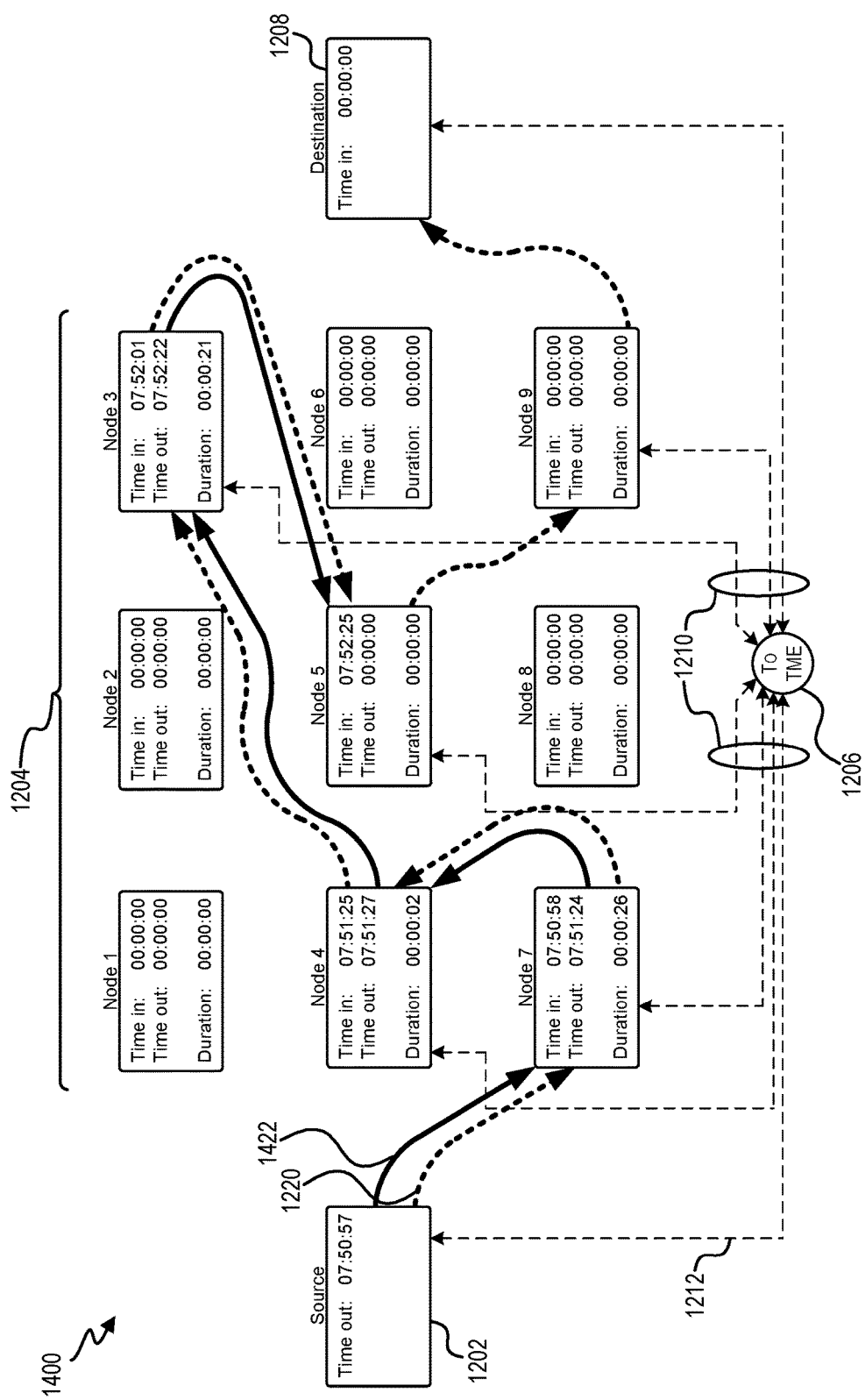
FIG. 14 is an example block diagram illustrating a network, according to at least one embodiment.

Turning next to FIG. 14, in FIG. 14 a network 1400 is illustrated in accordance with at least one embodiment of the present disclosure, which may be similar to networks 1200 and 1300 in many aspects. In some embodiments, the predicted path 1220 may be different than an actual path 1422 taken by the particular message within the network 1200 such that the actual path 1422 does not reach the destination node 1208. In the specific embodiment shown in FIG. 14, the predicted path 1220 includes node 9 and the destination node 1208 whereas the actual path 1422 does not include either. The transaction management engine may send a query to node 9 requesting a message status for the particular message and may receive information indicating that the message was never received by node 9. In some embodiments, multiple different predicted paths for the particular message may be determined, which may each be calculated using the different likelihood calculations described herein. After sending queries to different nodes of the multiple different predicted paths and receiving information indicating the message was not received by any node, it may be determined that the message needs to be reconciled.

Figure 15:
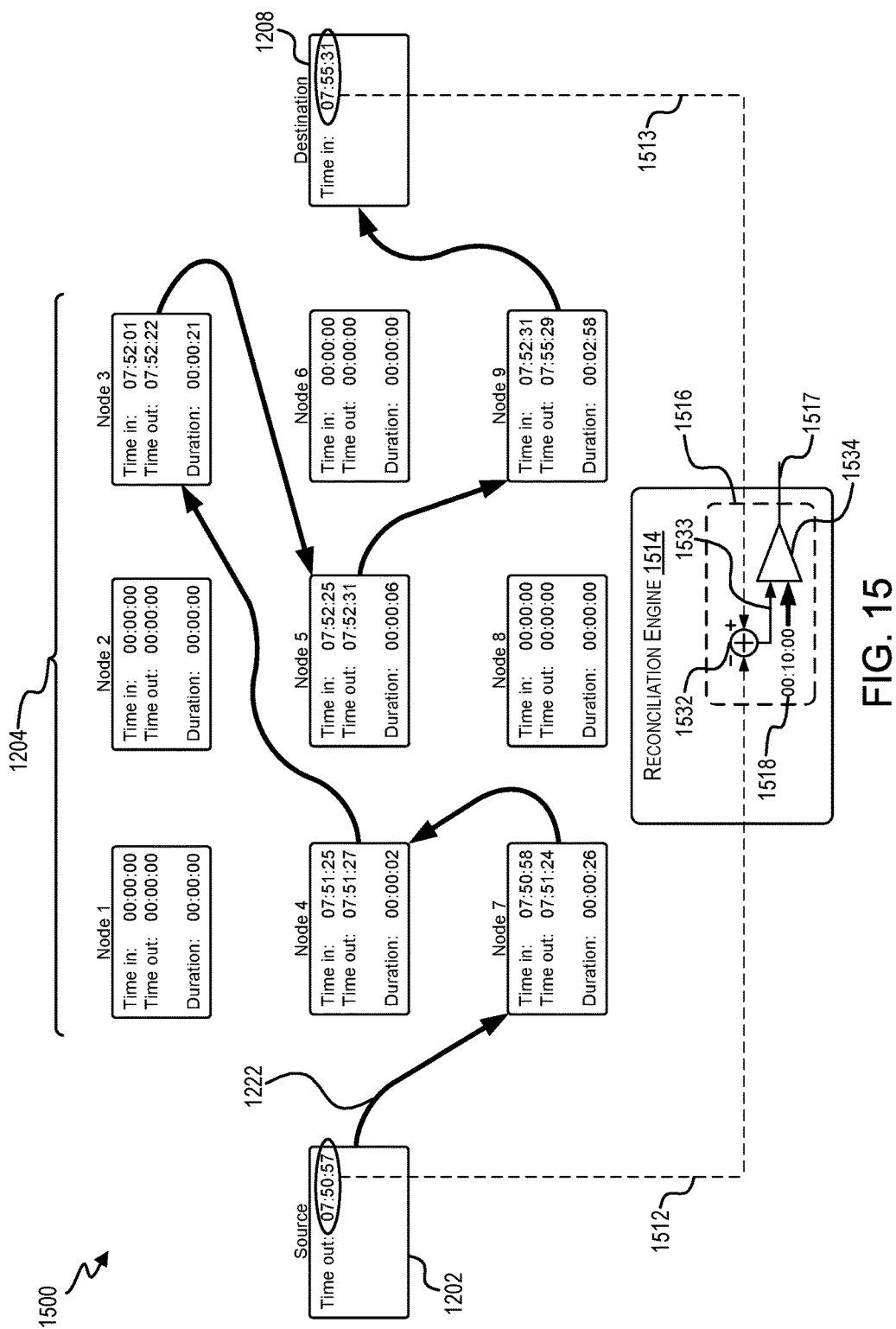
FIG. 15 is an example block diagram illustrating a network, according to at least one embodiment.

Turning next to FIG. 15, in FIG. 15 a network 1500 is illustrated in accordance with at least one embodiment of the present disclosure, which may be similar to networks 1200, 1300, and 1400 in many aspects. In some embodiments, the network 1500 may include a reconciliation engine 1514 for determining whether certain messages need to be reconciled. The reconciliation engine 1514 may include a timer circuit 1516 configured to send an alert when a particular message hasn't reached the destination node 1208 within a predetermined amount of time 1518. The reconciliation engine 1514 may continuously, periodically, and/or intermittently send queries to the source node 1202 and the destination node 1208 requesting a sent time 1512 from the source node 1202 and a received time 1513 from the destination node 1208. The timer circuit 1516 receives the sent time 1512 and the received time 1513 and subtracts the sent time 1512 from the received time 1513 using an adder 1532 to output an elapsed time 1533

In some instances, the elapsed time 1533 is used as one of the inputs to a comparator 1534 and the predetermined amount of time 1518 is used as the other input to the comparator 1534. When the elapsed time 1533 exceeds the predetermined amount of time 1518, an output signal 1517 indicates as such by going to a high voltage or a low voltage (e.g., on or off), and the reconciliation engine 1514 may determine that the particular message needs to be reconciled. When the elapsed time 1533 does not exceed the predetermined amount of time 1518, the output signal 1517 may also indicate as such by going to a high voltage or a low voltage. In the specific embodiment shown in FIG. 15, the elapsed time 1533 does not exceed the predetermined amount of time 1518 and the output signal 1517 is set to a low voltage. Use of the timer circuit 1516 significantly improves the speed and efficiency of message reconciliation tasks over conventional techniques. In some instances, it is advantageous to implement the timer circuit 1516 in an integrated circuit such as an application-specific integrated circuit (ASIC).

Figure 16:
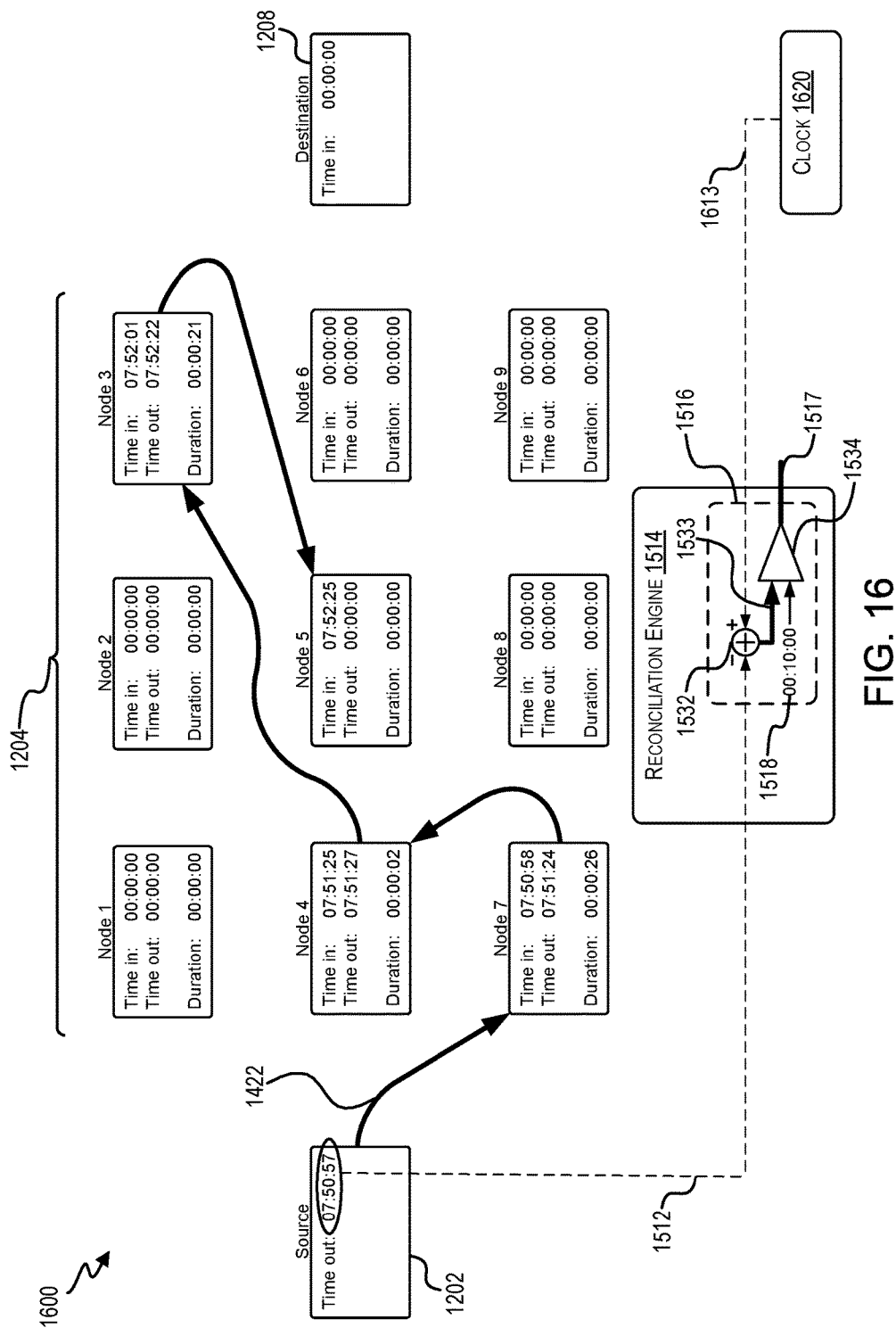
FIG. 16 is an example block diagram illustrating a network, according to at least one embodiment.

Turning next to FIG. 16, in FIG. 16 a network 1600 is illustrated in accordance with at least one embodiment of the present disclosure, which may be similar to networks 1200, 1300, 1400, and 1500 in many aspects. In some embodiments, the reconciliation engine 1514 may continuously, periodically, and/or intermittently send queries to the source node 1202 and the destination node 1208 requesting a sent time 1512 from the source node 1202 and a received time 1513 from the destination node 1208. If the destination node 1208 is unable to provide a received time, the reconciliation engine 1514 may instead send the query to the clock 1620 requesting the current time 1613. The timer circuit 1516 receives the sent time 1512 and the current time 1613 and subtracts the sent time 1512 from the current time 1613 using an adder 1532 to output an elapsed time 1533. In some instances, the elapsed time 1533 is used as one of the inputs to the comparator 1534 and the predetermined amount of time 1518 is used as the other input to the comparator 1534. In the specific embodiment shown in FIG. 16, the elapsed time 1533 exceeds the predetermined amount of time 1518 and the output signal 1517 is set to a high voltage. In such instances, a report and/or an alert may be sent to a user.

Figure 17:
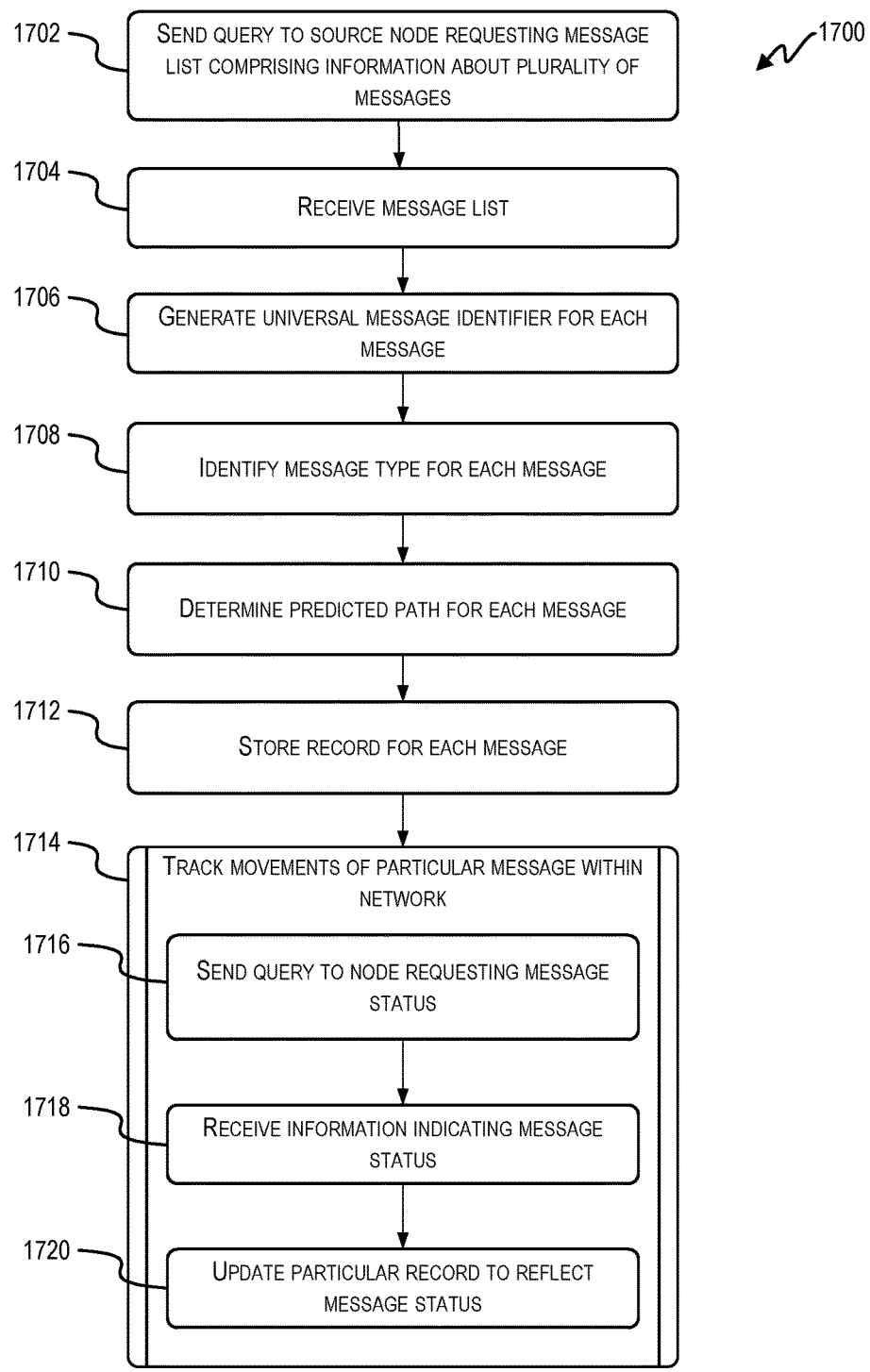
FIG. 17 is a flow diagram depicting example acts for implementing techniques relating to managing and tracking transactions within a network as described herein, according to at least one embodiment.

FIG. 17 illustrates a flowchart of a process 1700 for tracking movement of messages within a network according to an embodiment of the present disclosure. Some or all of the process 1700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1700 begins at block 1702 by sending an initial query to a source node of the network. The initial query may request a message list comprising information about a plurality of messages originating from the source node. In some embodiments, the message list includes a source application identifier for each of the plurality of messages. For example, the source application identifier may be the same or different for each of the plurality of messages and may, for example, be directly based on the source node or be equivalent to the source node. The message list may also include a source facility identifier for each of the plurality of messages which may, similar to the source application identifier, be directly based on the source node or be equivalent to the source node. In general, the source facility identifier indicates which facility created a particular message. The message list may further include a message type identifier which may be equivalent to the message type or may indicate a message type (e.g., ADT). The message list may also include a message control identifier which may, in some embodiments, be a unique serial number that allows different messages to be distinguished from each other. For example, a message may be referred to using its message control identifier within the network, and may be utilized by pointers to the message. The message list may include a time at which each of the messages was created. In some examples, each of the messages is representative of a single transaction within the network.

At block 1704, the process 1700 receives the message list from the source node. The message list may be received immediately or after a period of time from when the initial query is sent. Receiving the message list may include receiving a text file or a file in tabular form from which various information (e.g., source application identifier) may be parsed and extracted. In some instances, the entire message list is received all at once or within a threshold amount of time. In other instances, different sections of the message list are received as they become available and/or accessible by the source node. For example, a particular message may have been created by the source node but not yet have departed from the source node and therefore information in the message list with respect to a sent time would be unavailable.

At block 1706, the process 1700 generates a universal message identifier for each of the plurality of messages based in part on the message list. Each universal message identifier may include a concatenation of one, two, three, or all of a source application identifier, a source facility identifier, a message type identifier, and a message control identifier. In some examples, the universal message identifier represents an underlying message and is used to track the movements of the message as it moves throughout the network. In some examples, the universal message identifier represents a pointer to the message and enables selection and access of the message wherever it may be stored. In some embodiments, each of the one or more messages are altered to include the corresponding universal message identifiers. In some examples, altering the messages may include adding the universal message identifier to the headers of the messages. In some examples, the messages are in the HL7 format or any other suitable format.

At block 1708, the process 1700 identifies a message type for each of the plurality of messages based in part on the message list. In some instances, the message type is directly available from the message list (e.g., from the message type identifier), however, in some instances the message type may be predicted based on other available information in the message list. For example, a particular message that was created simultaneously with a plurality of other messages having an identical message type may be assumed to have the same or similar message type. The format of the message control identifier may also indicate the message type. For example, the arrangement of integers, letters, and punctuation in the message control identifier may depend on the message type and therefore may allow the message type to be determined based on an analysis of the message control identifier.

At block 1710, the process 1700 determines a predicted path for each of the plurality of messages based in part on the respective message type and the message list. The predicted path is a prediction of the actual path that the message has taken or will take through the network. In general, the predicted path includes a source node, one or more regional nodes, and a destination node, although in some instances may only include a source node and a destination node. The predicted path may also include arrival times, departure times, and/or durations associated with each node. In some embodiments, the predicted path is determined based on an analysis of historical averages for a given message type. For example, the predicted path may be determined by first collecting data for all previous messages having a particular message type and second performing a highest likelihood calculation. In some instances, the highest likelihood calculation may include identifying the most likely subsequent node based on the previous/current node, or may include identifying the most likely overall path. In many cases the predicted path using the most likely subsequent node approach differs from the predicted path using the most likely overall path. In general, the most likely subsequent node approach produces more reliable predictions than the overall path approach.

At block 1712, the process 1700 stores a record for each of the plurality of messages in a data store. Each record may include information corresponding to or associated with the respective universal message identifier and may, in some instances, include identical information that is included in the message list for a particular message. The record may be stored in the data store in a tabular format. For example, the table may include a source application identifier, a source facility identifier, a message type identifier, a message control identifier, and any other suitable entry for tracking the movement of the message. In some examples, once a message is received by a node of the network, the table is updated to indicate as such.

At block 1714, the process 1700 tracks movements of a particular message of the plurality of messages within the network by, for example, performing one or more of blocks 1716, 1718, and 1720.

At block 1716, the process 1700 sends a first query to a node of the network. In some embodiments, the predicted path for the particular message includes the node. For example, in some instances the first node in the predicted path (after the source node) is the first node to be queried when tracking a particular message, followed by the second node in the predicted path, the third node in the predicted path, etc. The first query may request a message status for the particular message with respect to the node of the network or, in some instances, may request all information pertaining to the particular message, or all information pertaining to all of the plurality of messages.

At block 1718, the process 1700 receives information indicating the message status. In some examples, the status may indicate that the message was received, negatively acknowledged, not received, or unknown. Based on the message status, additional queries may be sent to additional nodes. For example, if the message status indicates that the message was not received, additional queries may be sent to other nodes in the predicted path or other nodes outside the predicted path. In some instances, a new predicted path is determined in response to receiving a message status that indicates that the message was not received.

At block 1720, the process 1700 updates a particular record in the data store to reflect the message status by, for example, performing a write command to the particular record to reflect whether the message was received, negatively acknowledged, not received, or unknown. For example, where each row of a table corresponds to different records, different columns may correspond to different message statuses received from different nodes. A first column corresponding to a first node may include the entry "received and sent" and a second column corresponding to a second node may include the entry "not received". Entries in the table corresponding to received times, sent times, and durations may also be updated at block 1720. By promptly updating and maintaining each record for each of the plurality of messages, the movements of each message may be adequately tracked throughout the network such that problems that arise may be immediately addressed.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

Further details regarding the present invention may be found in U.S. patent application 62/113,154, filed on Feb. 6, 2015, and U.S. patent application Ser. No. 15/015,597, filed on Feb. 4, 2016, the disclosures of which are incorporated by reference herein for all purposes.

What is claimed is:

1. A computer-implemented method for tracking movements of messages within a network, the method comprising:
   sending, by a computer system, an initial query to a source node of the network, the initial query requesting a message list comprising information about a plurality of messages originating from the source node, each message of the plurality of messages representative of a single transaction within the network;
   receiving, by the computer system, the message list from the source node;
   generating, by the computer system, a universal message identifier for each of the plurality of messages based in part on the message list, each universal message identifier comprising a concatenation of two or more of a source application identifier, a source facility identifier, a message type identifier, and a message control identifier;
   identifying, by the computer system, a message type for each of the plurality of messages based in part on the message list;
   determining a predicted path for each of the plurality of messages based in part on the respective message type and the message list;
   storing a record for each of the plurality of messages in a data store, each record associated with the respective universal message identifier; and
   tracking movements of a particular message of the plurality of messages within the network by:
      sending, by the computer system, a first query to a node of the network requesting a message status for the particular message with respect to the node of the network, the predicted path for the particular message including the node;
      receiving, by the computer system, information indicating the message status; and
      updating a particular record in the data store to reflect the message status.

2. The computer-implemented method of claim 1, wherein the node processes the particular message after the source node processes the particular message.

3. The computer-implemented method of claim 2, wherein the information indicating the message status includes:
   a received time at which the particular message was received by the node; and
   a sent time at which the particular message was sent by the node.

4. The computer-implemented method of claim 3, wherein the node is a first node, the received time is a first received time, and the sent time is a first sent time, and wherein tracking the movements of the particular message of the plurality of messages within the network further includes:
   sending, by the computer system, a second query to a second node of the network requesting a second message status for the particular message with respect to the second node of the network, the predicted path including the second node;
   receiving, by the computer system, second information indicating the second message status; and
   updating the particular record in the data store to reflect the second message status, wherein the second information indicating the second message status for the particular message includes:
   a second received time at which the particular message was received by the second node; and
   a second sent time at which the particular message was sent by the second node.

5. The computer-implemented method of claim 2, wherein tracking the movements of the particular message of the plurality of messages within the network further includes:
   determining that the particular message was not received by the node, wherein the node is a first node and the information is first information;
   determining a second predicted path for the particular message based in part on the respective message type and the determination that the particular message was not received by the first node, wherein the predicted path is a first predicted path;
   sending, by the computer system, a second query to a second node of the network requesting a second message status for the particular message with respect to the second node of the network, the first predicted path not including the second node and the second predicted path including the second node; and
   receiving, by the computer system, second information indicating the second message status.

6. The computer-implemented method of claim 2, wherein tracking the movements of the particular message of the plurality of messages within the network further includes:
   sending, by the computer system, a second query to a destination node of the network requesting a second message status for the particular message with respect to the node of the network, the predicted path including the destination node;
   receiving, by the computer system, second information indicating the second message status, wherein the second information indicates whether the particular message was received by the destination node; and
   determining that the particular message needs to be reconciled based on the particular message not being received by the destination node.

7. The computer-implemented method of claim 2, wherein generating the universal message identifier for each of the plurality of messages includes creating or modifying a metadata for each of the plurality of messages to include the corresponding universal message identifiers.

8. A computer readable storage media for tracking movements of messages within a network, the computer readable storage media comprising instructions to cause one or more processors to perform operations comprising:
   sending an initial query to a first node of the network, the initial query requesting a message list comprising information about a plurality of messages originating from a source node, each message of the plurality of messages representative of a single transaction within the network;
   receiving the message list from the first node;
   generating a universal message identifier for each of the plurality of messages based in part on the message list, each universal message identifier comprising a concatenation of two or more of an application identifier associated with the first node, a facility identifier associated with the first node, a message type identifier, and a message control identifier;

identifying a message type for each of the plurality of messages based in part on the message list;
determining a predicted path for each of the plurality of messages based in part on the respective message type and the message list;
storing a record for each of the plurality of messages in a data store, each record associated with the respective universal message identifier; and
tracking movements of a particular message of the plurality of messages within the network by:
sending a first query to a second node of the network requesting a message status for the particular message with respect to the second node of the network, the predicted path for the particular message including the second node;
receiving information indicating the message status; and
updating a particular record in the data store to reflect the message status.

9. The computer readable storage media of claim 8, wherein the second node processes the particular message after the first node processes the particular message.

10. The computer readable storage media of claim 9, wherein the information indicating the message status includes:
a received time at which the particular message was received by the second node; and
a sent time at which the particular message was sent by the second node.

11. The computer readable storage media of claim 10, wherein the received time is a first received time, and the sent time is a first sent time, and wherein tracking the movements of the particular message of the plurality of messages within the network further includes:
sending a second query to a third node of the network requesting a second message status for the particular message with respect to the third node of the network, the predicted path including the third node;
receiving second information indicating the second message status; and
updating the particular record in the data store to reflect the second message status, wherein the second information indicating the second message status for the particular message includes:
a second received time at which the particular message was received by the third node; and
a second sent time at which the particular message was sent by the third node.

12. The computer readable storage media of claim 9, wherein tracking the movements of the particular message of the plurality of messages within the network further includes:
determining that the particular message was not received by the second node, wherein the information is first information;
determining a second predicted path for the particular message based in part on the respective message type and the determination that the particular message was not received by the second node, wherein the predicted path is a first predicted path;
sending a second query to a third node of the network requesting a second message status for the particular message with respect to the third node of the network, the first predicted path not including the third node and the second predicted path including the third node; and
receiving second information indicating the second message status.

13. The computer readable storage media of claim 9, wherein tracking the movements of the particular message of the plurality of messages within the network further includes:
sending a second query to a third node of the network requesting a second message status for the particular message with respect to the second node of the network, the predicted path including the third node;
receiving second information indicating the second message status, wherein the second information indicates whether the particular message was received by the third node; and
determining that the particular message needs to be reconciled based on the particular message not being received by the third node.

14. The computer readable storage media of claim 9, wherein generating the universal message identifier for each of the plurality of messages includes creating or modifying a metadata for each of the plurality of messages to include the corresponding universal message identifiers.

15. A system for tracking movements of messages within a network, the system comprising:
one or more processors;
one or more computer readable storage mediums comprising instructions to cause the one or more processors to perform operations comprising:
sending an initial query to a first node of the network, the initial query requesting a message list comprising information about a plurality of messages originating from the first node, each message of the plurality of messages representative of a single transaction within the network;
receiving the message list from the first node;
generating a universal message identifier for each of the plurality of messages based in part on the message list, each universal message identifier comprising a concatenation of two or more of an application identifier associated with the first node, a facility identifier associated with the first node, a message type identifier, and a message control identifier;
identifying a message type for each of the plurality of messages based in part on the message list;
determining a predicted path for each of the plurality of messages based in part on the respective message type and the message list;
storing a record for each of the plurality of messages in a data store, each record associated with the respective universal message identifier; and
tracking movements of a particular message of the plurality of messages within the network by:
sending a first query to a second node of the network requesting a message status for the particular message with respect to the second node of the network, the predicted path for the particular message including the second node;
receiving information indicating the message status; and
updating a particular record in the data store to reflect the message status.

16. The system of claim 15, wherein the second node processes the particular message after the first node processes the particular message.

17. The system of claim 16, wherein the information indicating the message status includes:
a received time at which the particular message was received by the second node; and a sent time at which the particular message was sent by the second node.

18. The system of claim 17, wherein the received time is a first received time, and the sent time is a first sent time, and wherein tracking the movements of the particular message of the plurality of messages within the network further includes:
- sending a second query to a third node of the network requesting a second message status for the particular message with respect to the third node of the network, the predicted path including the third node;
- receiving second information indicating the second message status; and
- updating the particular record in the data store to reflect the second message status, wherein the second information indicating the second message status for the particular message includes:
  - a second received time at which the particular message was received by the third node; and
  - a second sent time at which the particular message was sent by the third node.

19. The system of claim 16, wherein tracking the movements of the particular message of the plurality of messages within the network further includes:
- determining that the particular message was not received by the second node, wherein the information is first information;
- determining a second predicted path for the particular message based in part on the respective message type and the determination that the particular message was not received by the second node, wherein the predicted path is a first predicted path;
- sending a second query to a third node of the network requesting a second message status for the particular message with respect to the third node of the network, the first predicted path not including the third node and the second predicted path including the third node; and
- receiving second information indicating the second message status.

20. The system of claim 16, wherein tracking the movements of the particular message of the plurality of messages within the network further includes:
- sending a second query to a third node of the network requesting a second message status for the particular message with respect to the second node of the network, the predicted path including the third node;
- receiving second information indicating the second message status, wherein the second information indicates whether the particular message was received by the third node; and
- determining that the particular message needs to be reconciled based on the particular message not being received by the third node.

* * * * *